(12) United States Patent
Ghorayeb et al.

(10) Patent No.: US 12,018,554 B2
(45) Date of Patent: Jun. 25, 2024

(54) BLACK HOLE PARTICLE SWARM OPTIMIZATION FOR OPTIMAL WELL PLACEMENT IN FIELD DEVELOPMENT PLANNING AND METHODS OF USE

(71) Applicant: American University of Beirut, Beirut (LB)

(72) Inventors: Kassem Ghorayeb, Douha (LB); Ahmad Harb, Jnah (LB); Hussein Kassem, Chwaifat (LB)

(73) Assignee: American University of Beirut, Beirut (LB)

( * ) Notice: Subject to any disclaimer, the term of this patent is extended or adjusted under 35 U.S.C. 154(b) by 716 days.

(21) Appl. No.: 16/563,043

(22) Filed: Sep. 6, 2019

(65) Prior Publication Data

US 2020/0080406 A1   Mar. 12, 2020

Related U.S. Application Data

(60) Provisional application No. 62/727,851, filed on Sep. 6, 2018.

(51) Int. Cl.
| | | |
|---|---|---|
| *E21B 43/30* | (2006.01) | |
| *G01V 1/28* | (2006.01) | |
| *G06F 17/11* | (2006.01) | |

(52) U.S. Cl.
CPC ............... *E21B 43/30* (2013.01); *G01V 1/28* (2013.01); *G06F 17/11* (2013.01); *G01V 2210/1234* (2013.01)

(58) Field of Classification Search
CPC .. G01V 1/28; G01V 2210/1234; G06F 17/11; E21B 43/30; E21B 43/305; G06N 3/126; G06N 3/006; G06N 5/003; G06N 7/005; G06N 5/01; G06N 7/01
See application file for complete search history.

(56) References Cited

U.S. PATENT DOCUMENTS

| | | | |
|---|---|---|---|
| 8,504,335 B2 | 8/2013 | Furman et al. | 703/2 |
| 8,751,208 B2 | 6/2014 | Brouwer et al. | 703/10 |
| 8,793,111 B2 | 7/2014 | Tilke et al. | 703/10 |
| 8,793,200 B1 | 7/2014 | Chen et al. | G06N 5/003 |
| 9,336,480 B1 | 5/2016 | Owechko | G06N 3/006 |
| 9,703,006 B2 | 7/2017 | Stern et al. | G01V 11/00 |
| 9,810,052 B2* | 11/2017 | AlQahtani | G06Q 10/04 |
| 2014/0214387 A1* | 7/2014 | Tilke | E21B 43/305 |
| | | | 703/10 |
| 2014/0257767 A1 | 9/2014 | Chiang et al. | G06F 17/5009 |
| 2018/0089566 A1 | 3/2018 | Li et al. | G06N 3/08 |

OTHER PUBLICATIONS

Bejinariu et al. "Black Hole vs Particle Swarm Optimization". ECAI 2018—International Conference—10th Edition Electronics, Computers and Artificial Intelligence Jun. 28-Jun. 30, 2018. 6 Pages. (Year: 2018).*

(Continued)

*Primary Examiner* — Eunhee Kim
(74) *Attorney, Agent, or Firm* — J. Peter Paredes; Amin Wasserman Gurnani LLP

(57) ABSTRACT

Provided herein are systems, methods and apparatuses for a Black Hole Particle Swarm Optimization for Optimal Well Placement in Field Development Planning.

17 Claims, 27 Drawing Sheets

(56) References Cited

OTHER PUBLICATIONS

Ding et al. "Optimization of well placement by combination of a modified particle swarm optimization algorithm and quality map method". Comput Geosci (2014) 18:747-762. DOI 10.1007/s10596-014-9422-2. (Year: 2014).*

Jesmani et al. "Particle Swarm Optimization Algorithm for Optimum Well Placement Subject to Realistic Field Development Constraints". SPE-175590-MS. Sep. 14-16, 2015. 20 Pages. (Year: 2015).*

Jiang, M., et al., Stochastic convergence analysis and parameter selection of the standard particle swarm optimization algorithm, Information Processing Letters 102(1), 8-16. (Nov. 17, 2006).

Sarma, P., et al., Efficient Well Placement Optimization with Gradient-Based Algorithms and Adjoint Models, 2008 SPE Intelligent Energy Conference and Exhibition, SPE 112257, pp. 1-18 (Feb. 25-27, 2008).

Trelea, I. C., The particle swarm optimization algorithm: convergence analysis and parameter selection, Information Processing Letters 85(6), 317-325 (Sep. 12, 2002).

Zhang, W., et al., A parameter selection strategy for particle swarm optimization based on particle positions, Expert Systems with Applications 41(7), 3576-3584 (2014).

* cited by examiner

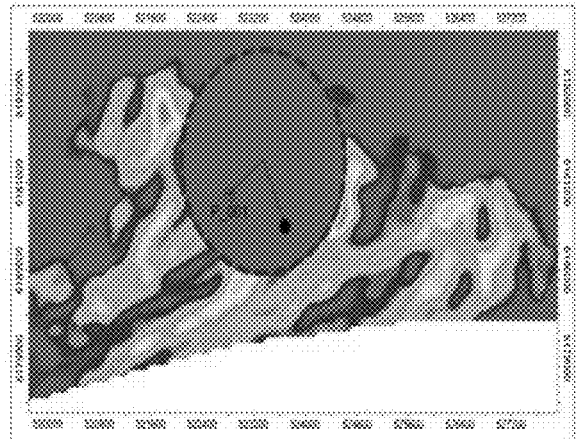
(a) Producer 1
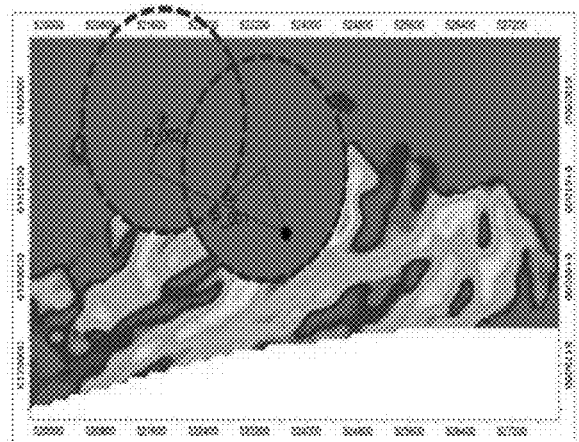
(b) Producer 2
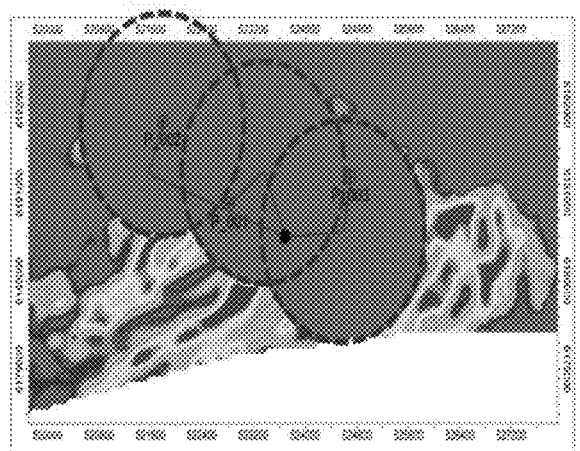
(c) Producer 3
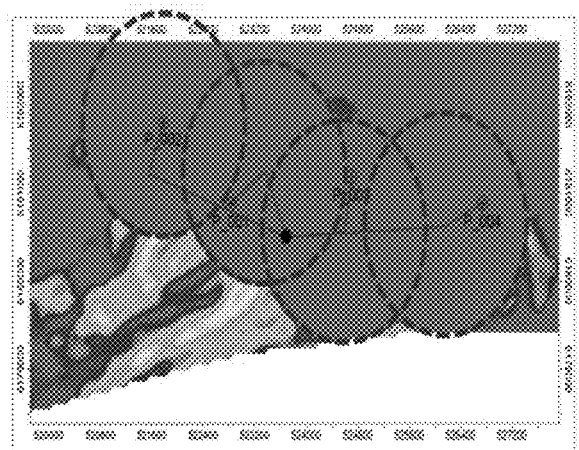
(d) Producer 4
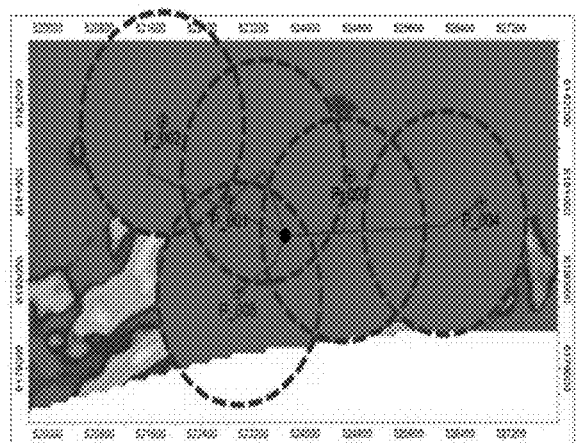
(e) Producer 5
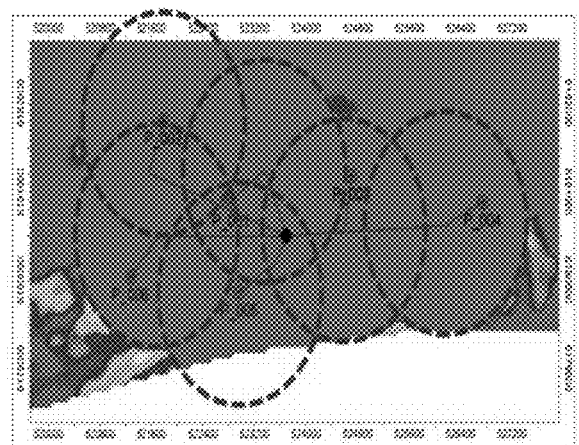
(f) Producer 6
FIG. 4B

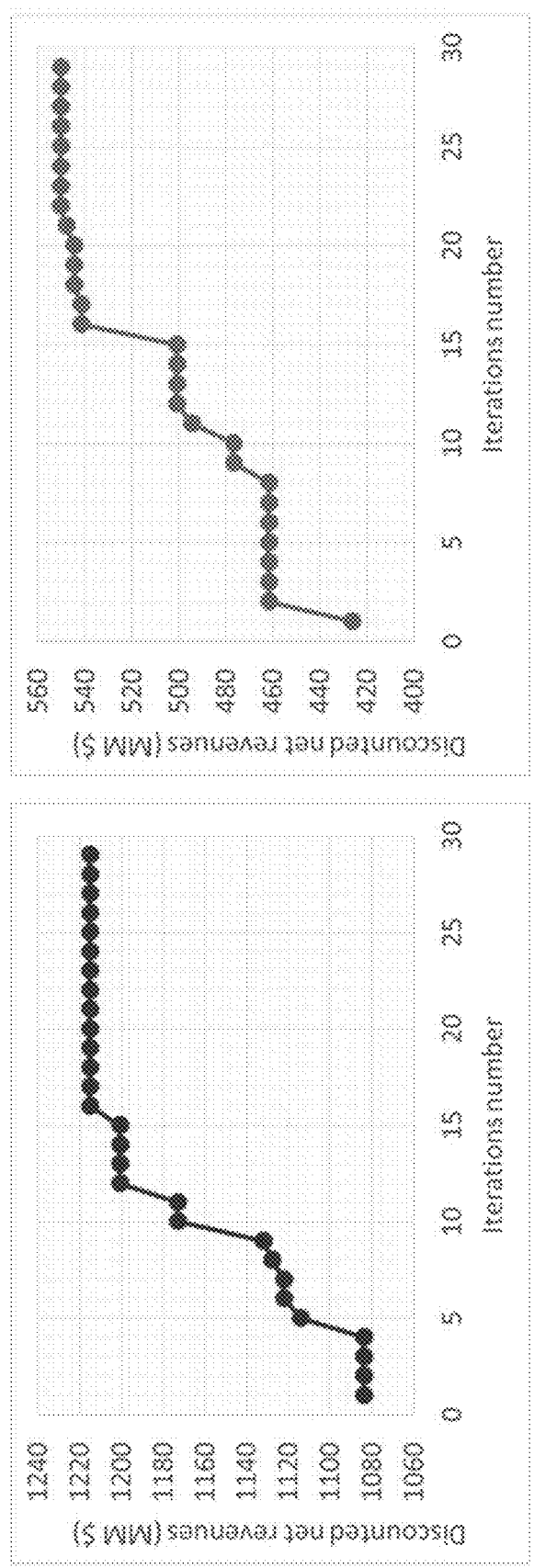
FIG. 6A – Olympus Upper
FIG. 6B – Olympus Lower

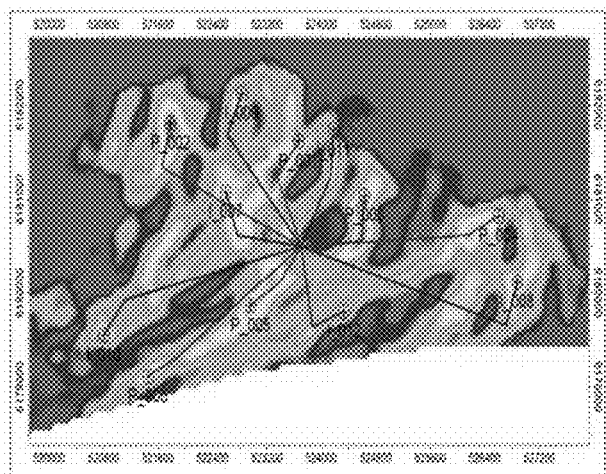
(a) 6 producers, 6 injectors
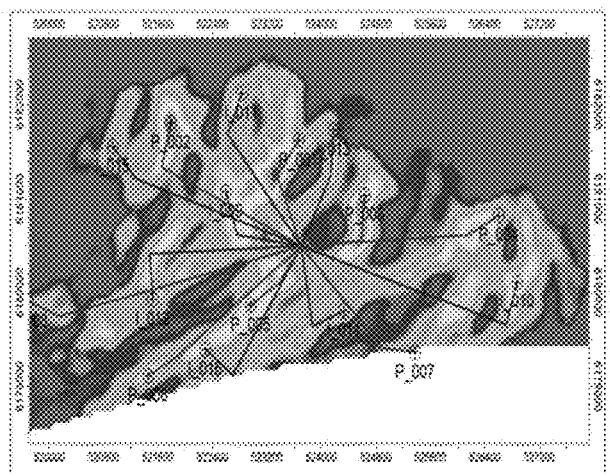
(b) 8 producers, 8 injectors
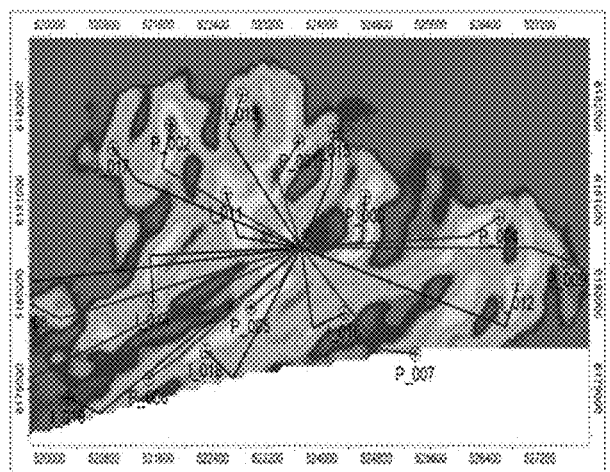
(c) 10 producers, 10 injectors
FIG. 15

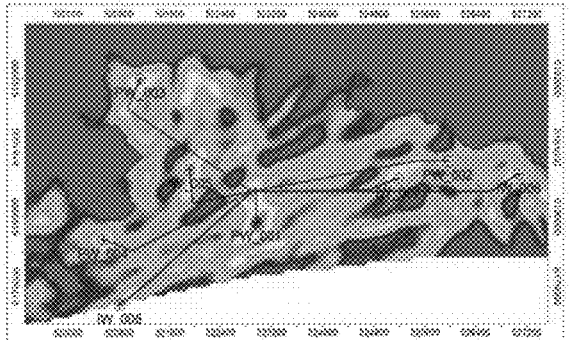 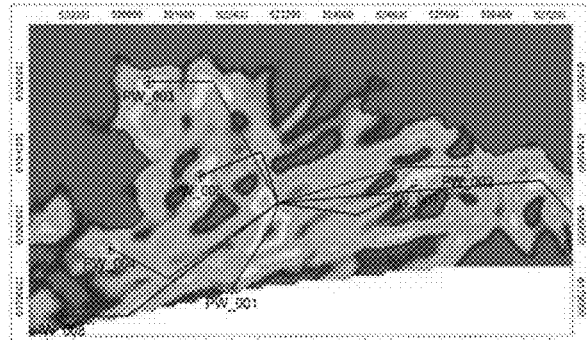
(a) 8 Horizontal Wells; 500m     (b) 8 Horizontal Wells; 1000m
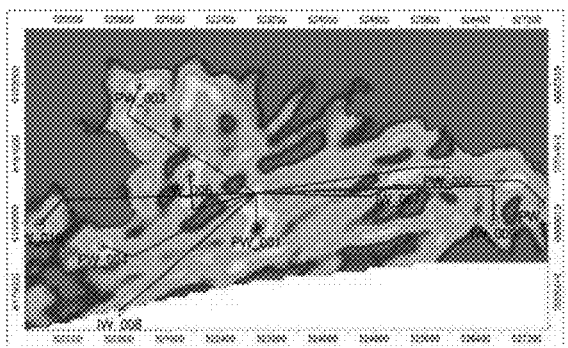 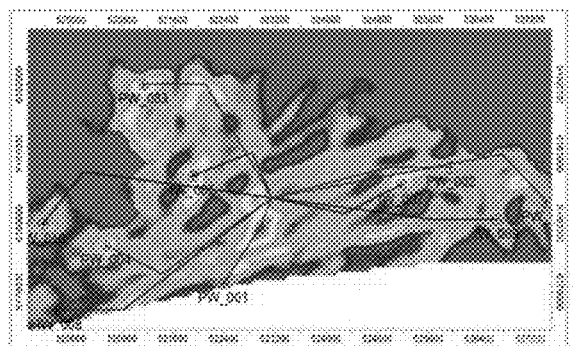
(c) 10 Horizontal Wells; 1000m     (d) 10 Horizontal Wells; 1000m
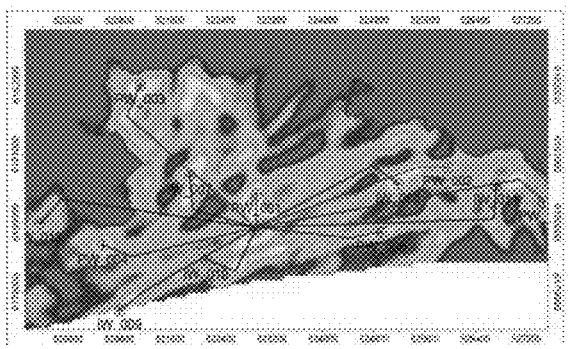 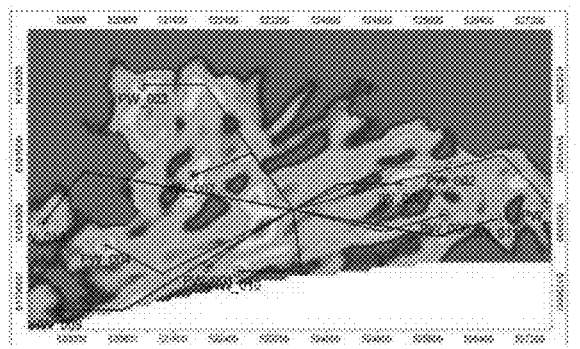
(e) 12 Horizontal Wells; 500m     (f) 12 Horizontal Wells; 1000m
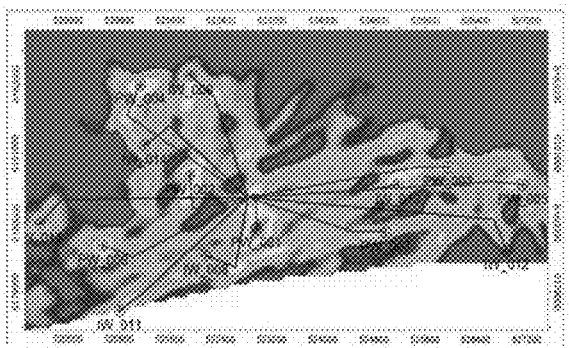 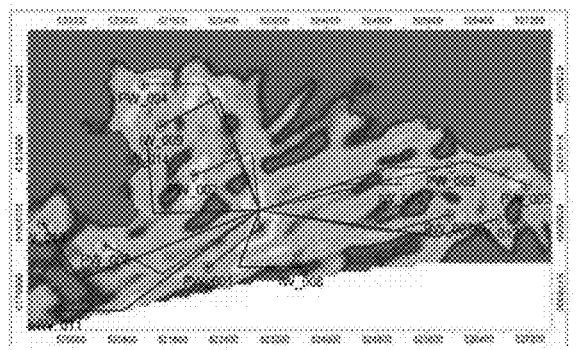
(g) 14 Horizontal Wells; 500m     (h) 14 Horizontal Wells; 1000m
FIG. 16

(a) Well spacing = 1300m (b) Well spacing = 1400m (c) Well spacing = 1500m (d) Well spacing = 1600m

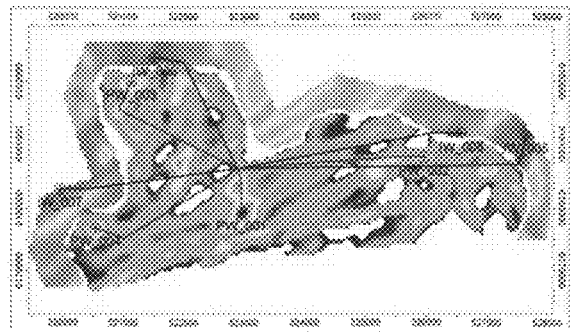
(a) 8 Horizontal Wells; 500m
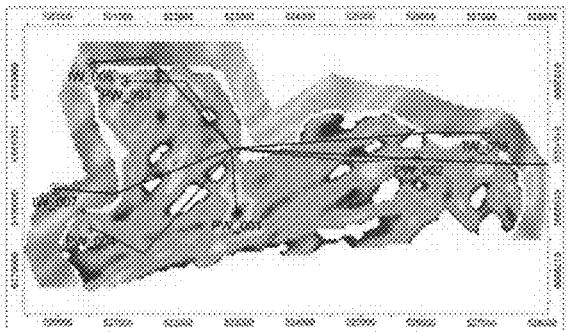
(b) 8 Horizontal Wells; 1000m
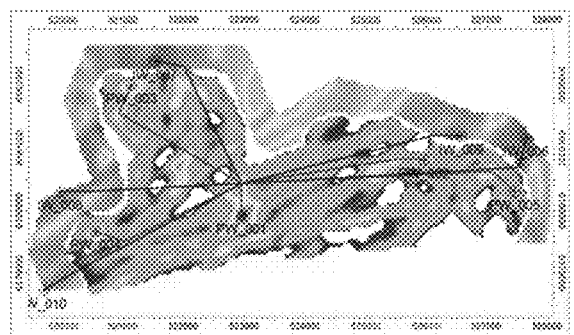
(c) 10 Horizontal Wells; 1000m
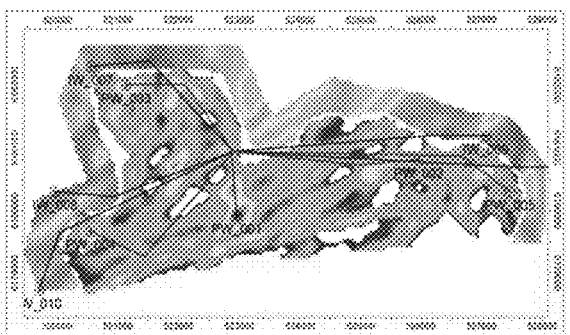
(d) 10 Horizontal Wells; 1000m
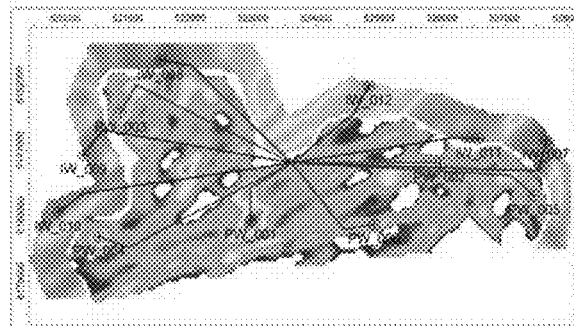
(e) 12 Horizontal Wells; 500m
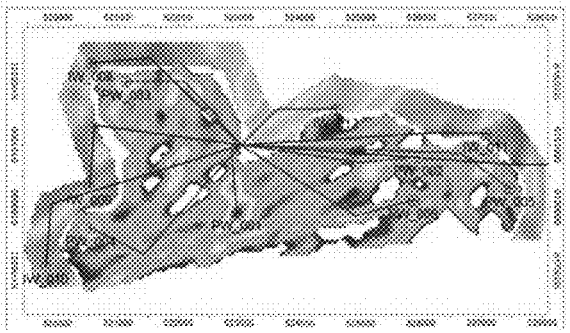
(f) 12 Horizontal Wells; 1000m
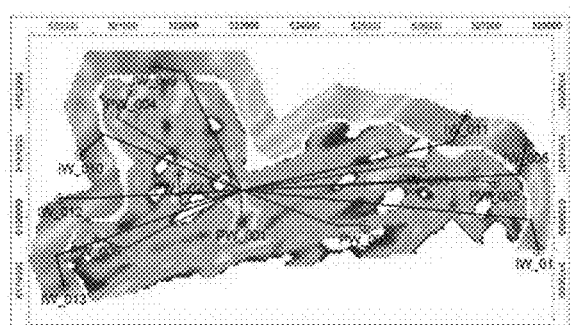
(g) 14 Horizontal Wells; 500m
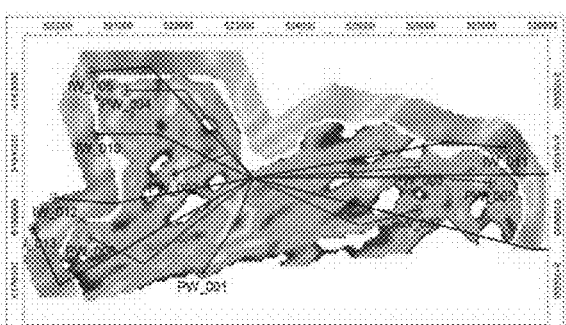
(h) 14 Horizontal Wells; 1000m
FIG. 18

(a) Well spacing = 1300m (b) Well spacing = 1400m (c) Well spacing = 1500m (d) Well spacing = 1600m

BLACK HOLE PARTICLE SWARM OPTIMIZATION FOR OPTIMAL WELL PLACEMENT IN FIELD DEVELOPMENT PLANNING AND METHODS OF USE

CROSS-REFERENCE TO RELATED APPLICATIONS

The present application claims priority to U.S. provisional application Ser. No. 62/727,851, filed Sep. 6, 2018, herein incorporated by reference in its entirety.

BACKGROUND

The invention generally relates to well placement optimization in field development planning.

Well placement optimization is a very challenging task as it involves a large number of optimization variables resulting from the multidimensional space of well parameters. Manual assessment of the permutation of these variables yields an excessively large number of development scenarios and, hence, it is practically unfeasible in the process of field development planning.

The two most popular evolutionary optimization solutions currently used in the oil industry are Genetic Algorithm and Particle Swarm Optimization. These solutions are global search, stochastic algorithms that operate without the computation of the objective function derivatives. They are equipped with internal operators that tend to avoid local optima of the problem in hand.

Currently, the position of every well is considered a decision variable in the application of these algorithms to field development planning. In large-scale field development cases that may involve hundreds of wells, this leads to an over-parameterization problem making the optimization workflow practically infeasible.

The present invention attempts to solve these problems as well as others.

SUMMARY OF THE INVENTION

Provided herein are systems, methods and apparatuses for a Black Hole Particle Swarm Optimization for Optimal Well Placement in Field Development Planning.

The methods, systems, and apparatuses are set forth in part in the description which follows, and in part will be obvious from the description, or can be learned by practice of the methods, apparatuses, and systems. The advantages of the methods, apparatuses, and systems will be realized and attained by means of the elements and combinations particularly pointed out in the appended claims. It is to be understood that both the foregoing general description and the following detailed description are exemplary and explanatory only and are not restrictive of the methods, apparatuses, and systems, as claimed.

BRIEF DESCRIPTION OF THE DRAWINGS

In the accompanying figures, like elements are identified by like reference numerals among the several preferred embodiments of the present invention.

FIG. 4B is a graph illustrating the process through which wells drainage areas are eliminated when generating the production wells. In this process, the radius used in this elimination is 2×TWS (Technical Well Spacing).

FIG. 6A is a graph showing the Summary of Optimization results using BHPSO with the discounted net revenues are 1215 MM$ for Upper; and FIG. 6B is a graph showing the Summary of Optimization results using BHPSO with the discounted net revenues are 550 MM$ for Lower, respectively. The discounted net revenue includes the well cost, OPEX and discounted revenues.

FIG. 15 is a graph showing well distribution corresponding to different well counts generated using the black hole operator. Horizontal length=500 m. Well spacing (2R)=1400 m. Olympus Upper.

FIG. 16 is a graph showing sensitivity on the number of wells generated using the black hole operator for two different horizontal section lengths. Olympus Upper, Realization 22, Pattern water injection.

FIG. 18 is a graph showing sensitivity on the number of wells generated using the black hole operator for two different horizontal section lengths. Olympus Upper, Realization 22, Peripheral water injection.

DETAILED DESCRIPTION OF THE INVENTION

Figure 1A:
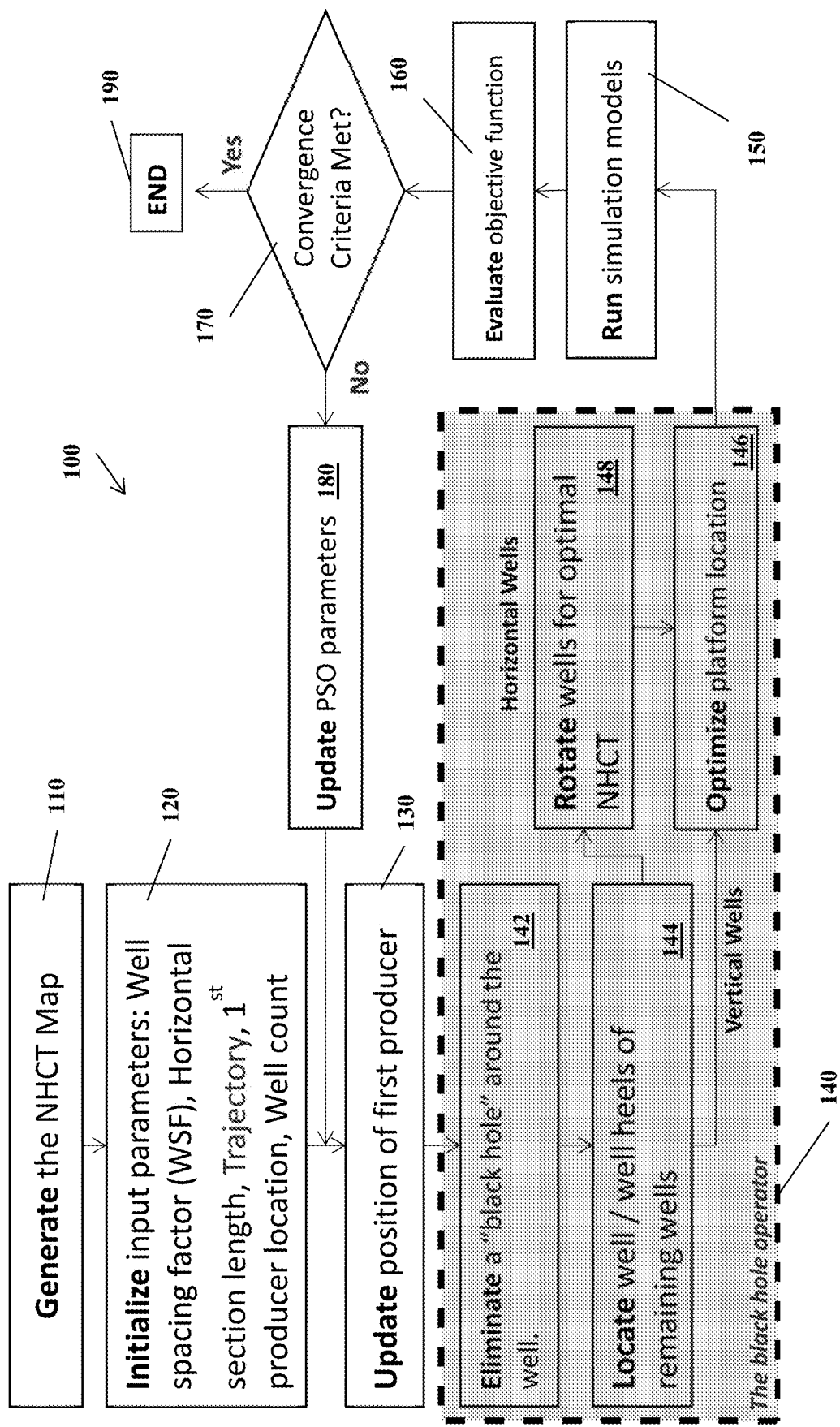
FIG. 1A is a flow chart of the Black Hole Particle Swarm Optimization according to one embodiment.

The foregoing and other features and advantages of the invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

Embodiments of the invention will now be described with reference to the Figures, wherein like numerals reflect like elements throughout. The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein. The words proximal and distal are applied herein to denote specific ends of components of the instrument described herein. A proximal end refers to the end of an instrument nearer to an operator of the instrument when the instrument is being used. A distal end refers to the end of a component further from the operator and extending towards the surgical area of a patient and/or the implant.

The use of the terms "a" and "an" and "the" and similar referents in the context of describing the invention are to be construed to cover both the singular and the plural, unless otherwise indicated herein or clearly contradicted by context. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Recitation of ranges of values herein are merely intended to serve as a shorthand method of referring individually to each separate value falling within the range, unless otherwise indicated herein, and each separate value is incorporated into the specification as if it were individually recited herein. The word "about," when accompanying a numerical value, is to be construed as indicating a deviation of up to and inclusive of 10% from the stated numerical value. The use of any and all examples, or exemplary language ("e.g." or "such as") provided herein, is intended merely to better illuminate the invention and does not pose a limitation on the scope of the invention unless otherwise claimed. No language in the specification should be construed as indicating any nonclaimed element as essential to the practice of the invention.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As used herein the term "method" refers to manners, means, techniques and procedures for accomplishing a given task including, but not limited to, those manners, means, techniques and procedures either known to, or readily developed from known manners, means, techniques and procedures by practitioners of the software, electrical, mechanical, and physical arts. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Generally speaking, a novel well placement optimization method is disclosed. The Black Hole Particle Swarm Optimization (BHPSO) comprises simultaneously optimizing the well count, the location, the type, the trajectory, the horizontal section length and the platform location. The standard Particle Swarm Optimization (PSO) is operably coupled with a static optimizer, the Black Hole Optimizer (BHO) which considerably reduces the CPU requirement for convergence into a global optimal.

In the following embodiment, the standard/traditional PSO used for well placement optimization is enabled.

PSO is a stochastic global optimization method developed by Eberhart and Kennedy [Eberhart, R. C., Kennedy, J.: A new optimizer using particle swarm theory: Proceedings of the 6th International Symposium on Micro Machine and Human Science, pp. 39-43 (1995)]. It is based on the social behaviors observed in swarms of animals. PSO uses a set of candidate solutions at each iteration. Each of these candidate solutions is called a particle and the collection of particles is called the swarm. Like GA, PSO is a population-based algorithm. In the FSO algorithm, particle swarm consists of M particles, and the position of each particle stands for the potential solution in n-dimensional space. The position of the particle i at n-dimension noted as $x_i=(x_{i1}, x_{i2}, \ldots, x_{in})$, . . . and the speed of the particle i movement at n-dimension is $v_i=(v_{i1}, v_{i2}, \ldots, v_{in})$. The optimal position of the particle i in the n-dimension quantity of the swarm is $p_i=(p_{i1}, p_{i2}, \ldots, p_{in})$, namely personal best (pbest). The optimal position of the whole swarm is $p_g$, also noted as global best (gbest). After finding pbest and gbest, the velocity and position of each particle change according the following equation:

$$v_i(t+1)=wv_i+c_1r_1(p_i(t)-x_i(t))+c_2r_2(p_g(t)-x_i(t));  \quad (1)$$

$$x_i(t+1)=x_i(t)+v_i(t+1); \quad (2)$$

where t is the current number of iterations; w, $c_1$, and $c_2$ are weights; and $r_1$ and $r_2$ are random numbers within the interval (0, 1); and $p_i(t)$ is the optimal position of particle i in the n-dimension quantity of the swarm at the iteration t; and $p_g(t)$ is the optimal position of the whole swarm for PSO at the iteration t. In general, PSO uses w=0.721 and $c_1$=$c_2$=1.193 [Aliyev, E.: Use of hybrid approaches and metaoptimization for well placement problems. Stanford University, Doctoral dissertation (2011)].

However, like most optimization heuristics, PSO suffers from the drawback of being greatly influenced by the selection of its parameter values. It is well known that PSO has several parameters like w, $c_1$, and $c_2$ or the swarm size to tune and that the performance of the algorithm significantly depends on the choice of these parameters. Usually, such tuning is a lengthy, time-consuming, and delicate process.

The performance of the PSO algorithm depends to some extent on the neighborhood topology. Particle topologies or neighborhoods refer to the grouping of particles into subgroups. A particular particle can communicate and exchange information about the search space only with other particles in its neighborhood [Onwunalu, J., Durlofsky, L. J.: Application of a particle swarm optimization algorithm for determining optimum well location and type. Comput. Geosci 14(1), 183-198 (2010)]. There are several types of PSO neighborhood topologies [Engelbrecht, A. P.: Fundamentals of computational swarm intelligence. Wiley, Chichester (2005); Mendes, R., Kennedy, J., Neves, J.: Watch thy neighbor or how the swarm can learn from its environment: Proceedings of Swarm Intelligence Symposium in the 2003 IEEE, pp. 88-94 (2003)], and Onwunalu and Durlofsky (2010) first applied PSO algorithm for the optimization of well type and location and stated that they observed the best performance using a random neighborhood topology, which leads to a "local best" PSO algorithm (rather than global best PSO).

In the following embodiment, the new BHPSO algorithm is enabled.

In one embodiment, for each particle in an "iteration/generation", the location of the first producer is identified using PSO based on a predefined cut-off of the net hydrocarbon thickness (NHCT) map. The remaining number of wells (producers and injectors), whose number is also potentially decided by PSO as an optimization parameter, are then automatically and optimally placed using the Black Hole (BH) Operator where wells are automatically and optimally placed using primarily a net hydrocarbon thickness (NHCT) map. The NHCT map is updated after every well placement by eliminating a disk (Black Hole) of a radius which is also a PSO optimization parameter. For horizontal wells, once the heel/toe of the well is placed, the method identifies the azimuth corresponding to a maximum cumulative NHCT. Another potential optimization parameter is the well trajectory; vertical vs. horizontal.

As shown in FIG. 1A, the BHPSO 100 comprises generating a NHCT map 110, initializing input parameters ( . . . ) 120, updating the position of the $1^{st}$ producer 130 and after that, the black hole operator 140 starts working. The black hole operator 140 comprises eliminating a black hole around the $1^{st}$ producer with a radius equal to TWS 142, then while black holing it systemically place the heels of the remaining wells one by one in cells holding the maximum NHCT values 144. In case the trajectory defined by PSO is vertical, the blackhole operator 140 comprises fixing wells in position then directly optimizing the platform position 146. In case of horizontal trajectory, the Black hole comprises rotating the horizontal section with a predefined azimuth increment and placing it in the group of cells with the maximum NHCT value 148 then after placing the wells, the platform position is optimized 146. The process continues to run simulation models 150, evaluating objective function 160 and then deciding if the convergence criteria are met 170. If the convergence criteria are not met, the PSO parameters are updated in step 180 and proceeds back to step 130 for updating the position of the first producer. If the convergence criteria are met, then the BHPSO 100 ends in step 190.

Figure 1B:
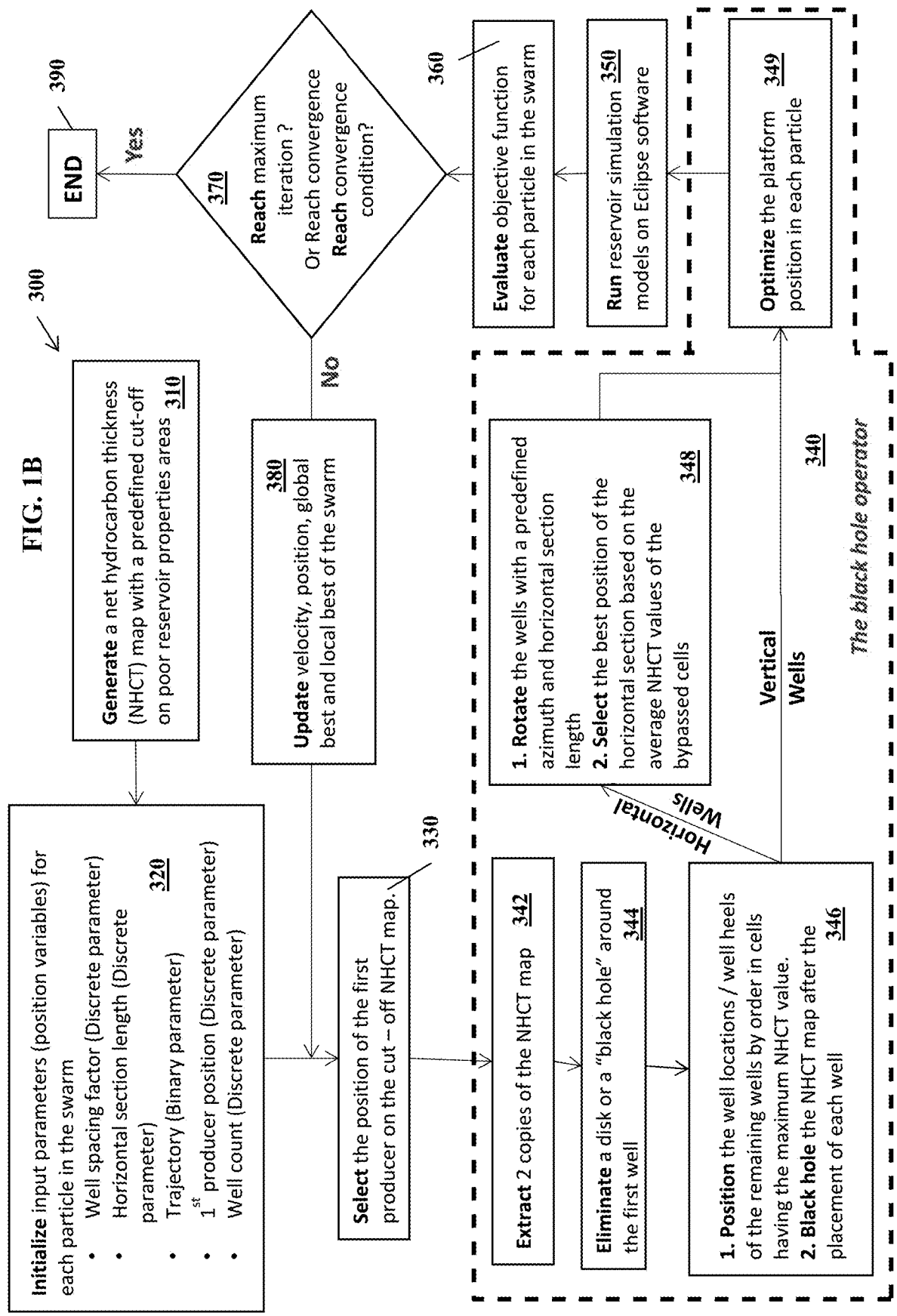
FIG. 1B is a flow chart of the Black Hole Particle Swarm Optimization detailing the different steps of FIG. 1A.

As shown in FIG. 1B, a further detailed BHPSO 300 comprises generating a net hydrocarbon thickness (NHCT) map with a predefined cut-off on low productive zones or with a predefined cut-off on poor reservoir properties areas 310. Then, BHPSO initializes input parameters (position variables) for each particle in the swarm 320 including the Well spacing factor (Discrete parameter), Horizontal section length (Discrete parameter), Trajectory (Binary parameter), 1st producer position (Discrete parameter), and Well count (Discrete parameter). Then, BHPSO selects the position of the first producer on the cut off the NHCT map 330. Then, BHPSO proceeds into the black hole operator 340. Then, BHPSO extracts 2 copies of the NHCT map 342 and eliminates a disk or a "black hole" around the first well or equal of a radius equal to the technical well spacing (TWS) 344. The black hole operator 340 comprises positioning the well locations/well heels of the remaining wells by order in cells having the maximum NHCT value and creating the Black hole the NHCT map after the placement of each well 346. For horizontal wells, the black hole operator 340 comprises rotating the wells with a predefined azimuth and horizontal section length, and selecting the best position of the horizontal section based on the average NHCT values of the bypassed cells 348. For vertical wells, the black hole operator 140 comprises optimizing the platform position in each particle 349. The black hole operator 140 is complete and then BHPSO runs reservoir simulation models on eclipse software 350, evaluates objective function for each particle in the swarm 360, and determines if it reached a maximum iteration or reach convergence or a convergence condition 370. If BHPSO did not reach a maximum iteration or reach convergence or a convergence condition, then BHPSO updates velocity, position, global best and local best of the swarm 380 and proceeds back to step 330 for selecting the position of the first producer on the cut-off NHCT map. If BHPSO did reach a maximum iteration or reach convergence or a convergence condition, the BHPSO ends 390.

Figure 2:
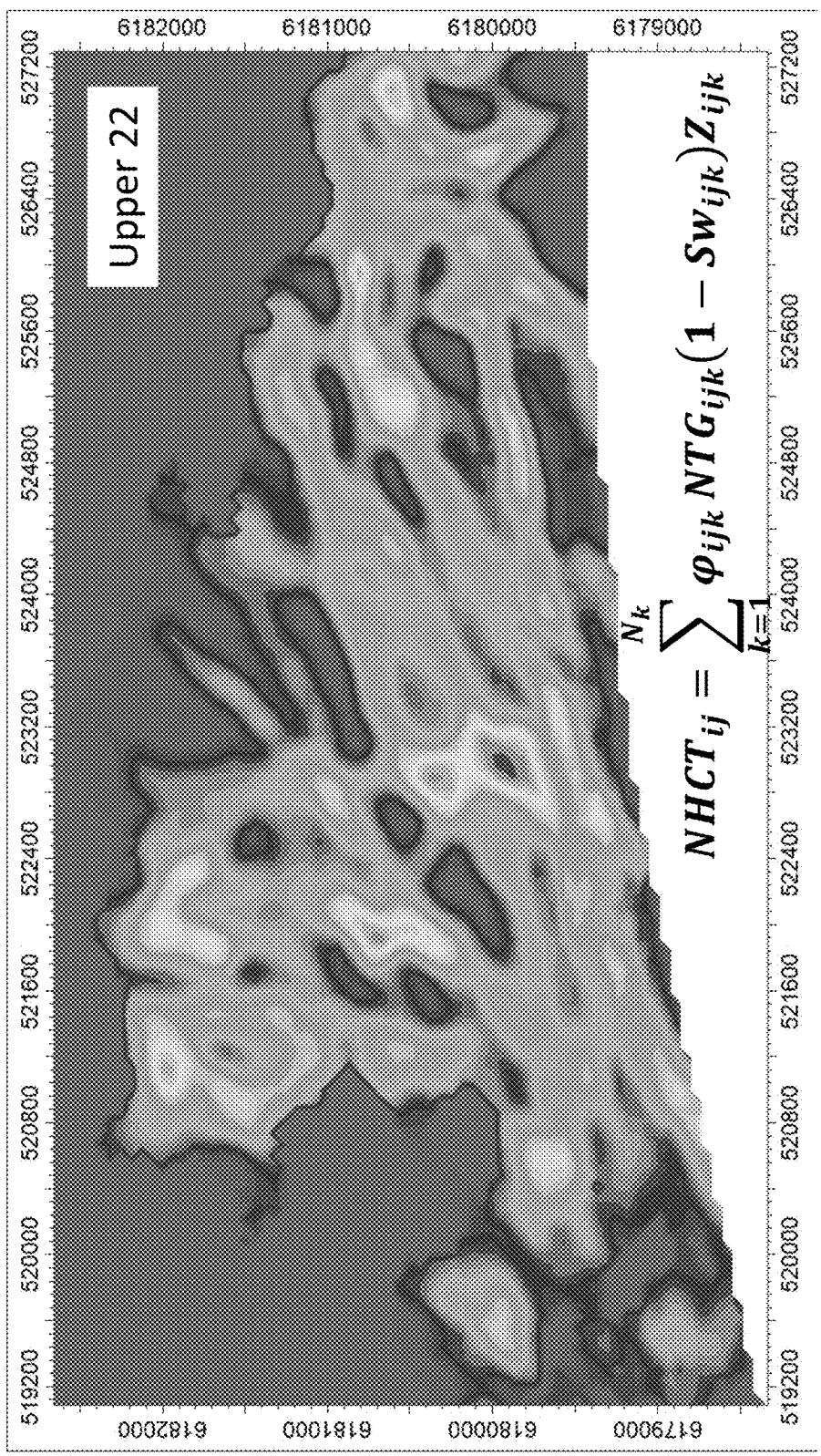
FIG. 2 is a graph showing the Net Hydrocarbon Thickness map which is used as a guide according to one embodiment.

As shown in FIG. 2, the Net Hydrocarbon thickness map is the guide of the optimization process. The NHCT map a 2-D condensed version of the 3D reservoir model. It is generated by summing up the multiplication of porosity, Net-to-gross (NTG), Oil saturation and thickness of cells lying vertically under each other.

Figure 3A:
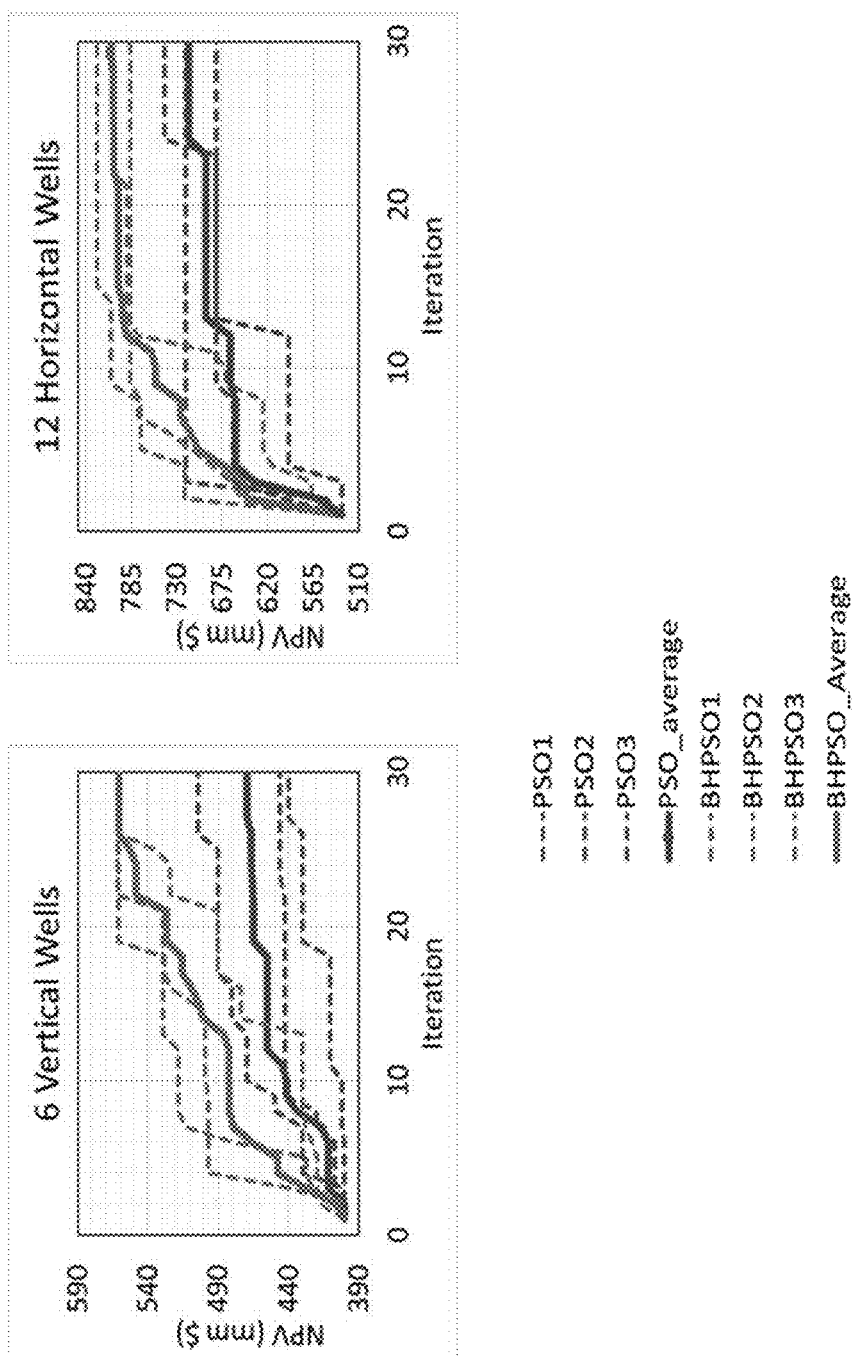
FIGS. 3A-3C a graph comparing the results of the standard PSO to those from one embodiment of the invention and showing that the proposed optimization method systematically outperforms the standard PSO while being virtually independent on the number of wells.

FIG. 3A is a graph showing the results obtained using BHPSO vs. PSO for the Olympus Synthetic Field Case. The Comparison with Standard PSO is performed on Olympus Upper, Realization 22 with a Swarm Size of 10 particles on two different simulation cases: 6 vertical wells and 12 horizontal wells, respectively. BHPSO performance is represented by the green curves while the standard PSO is represented by the red curves. The single simulation trials are depicted by dashed lines while their average is depicted by a bold line. The FIG. 3A clearly illustrates the superiority of BHPSO over standard PSO.

Figure 3B:
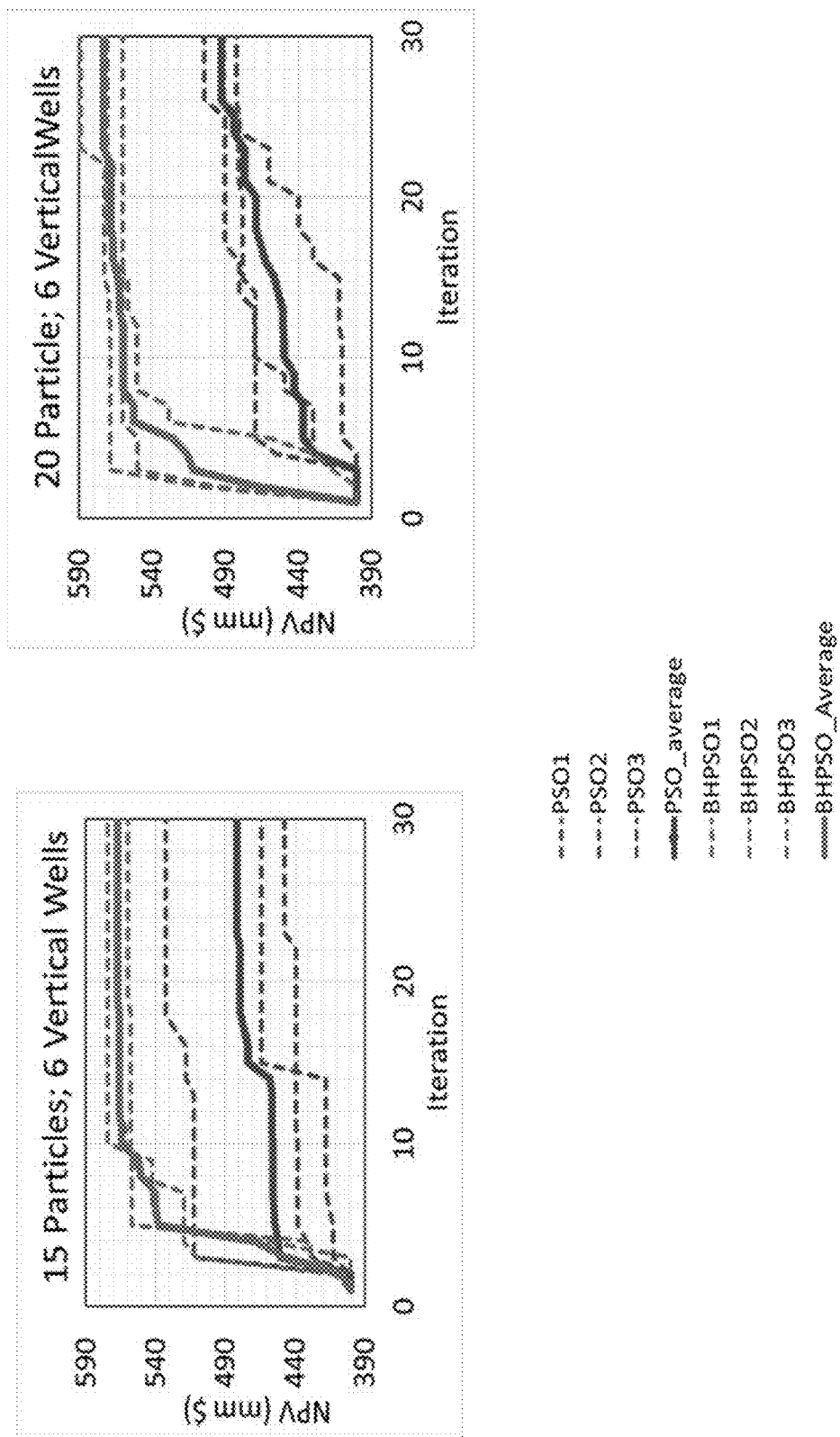

FIG. 3B is a graph showing the results obtained using BHPSO vs. PSO for the Olympus Synthetic Field Case on the 6 vertical wells simulation case with different number of particles (15 and 20 particles). The Comparison with Standard PSO is performed on Olympus Upper, Realization 22. BHPSO performance is represented by the green curves while the standard PSO is represented by the red curves. The single simulation trials are depicted by the dashed lines while their average is depicted by the bold line. The figure clearly illustrates the superiority of BHPSO over standard PSO.

Figure 3C:
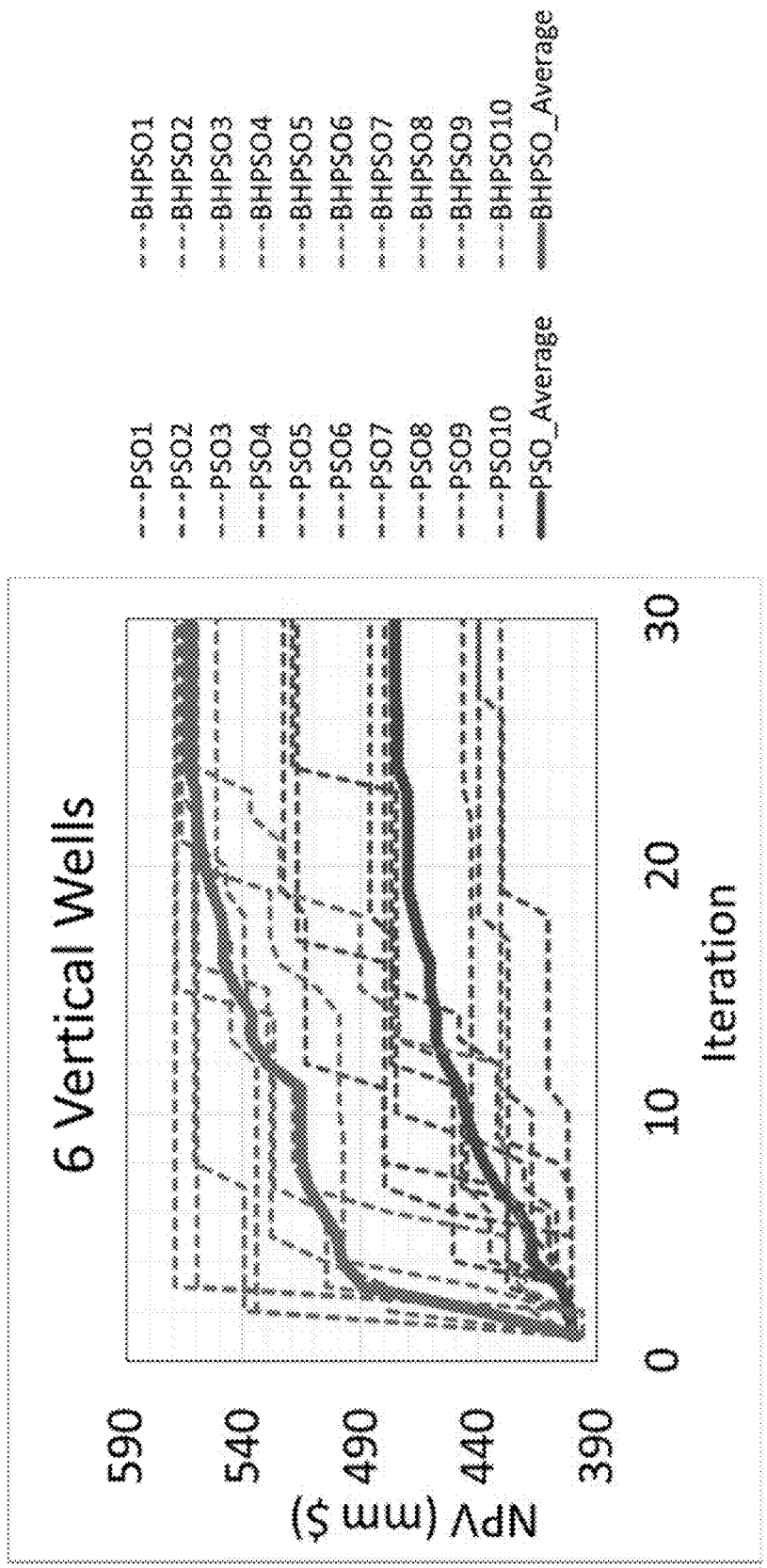

FIG. 3C is a graph showing the results obtained using BHPSO vs. PSO for the Olympus Synthetic Field Case on the 6 vertical wells simulation case with 10 particles but repeated 10 times to stress test the stochastic nature of the algorithm. BHPSO performance is represented by the green curves while the standard PSO is represented by the red curves.

Figure 4A:
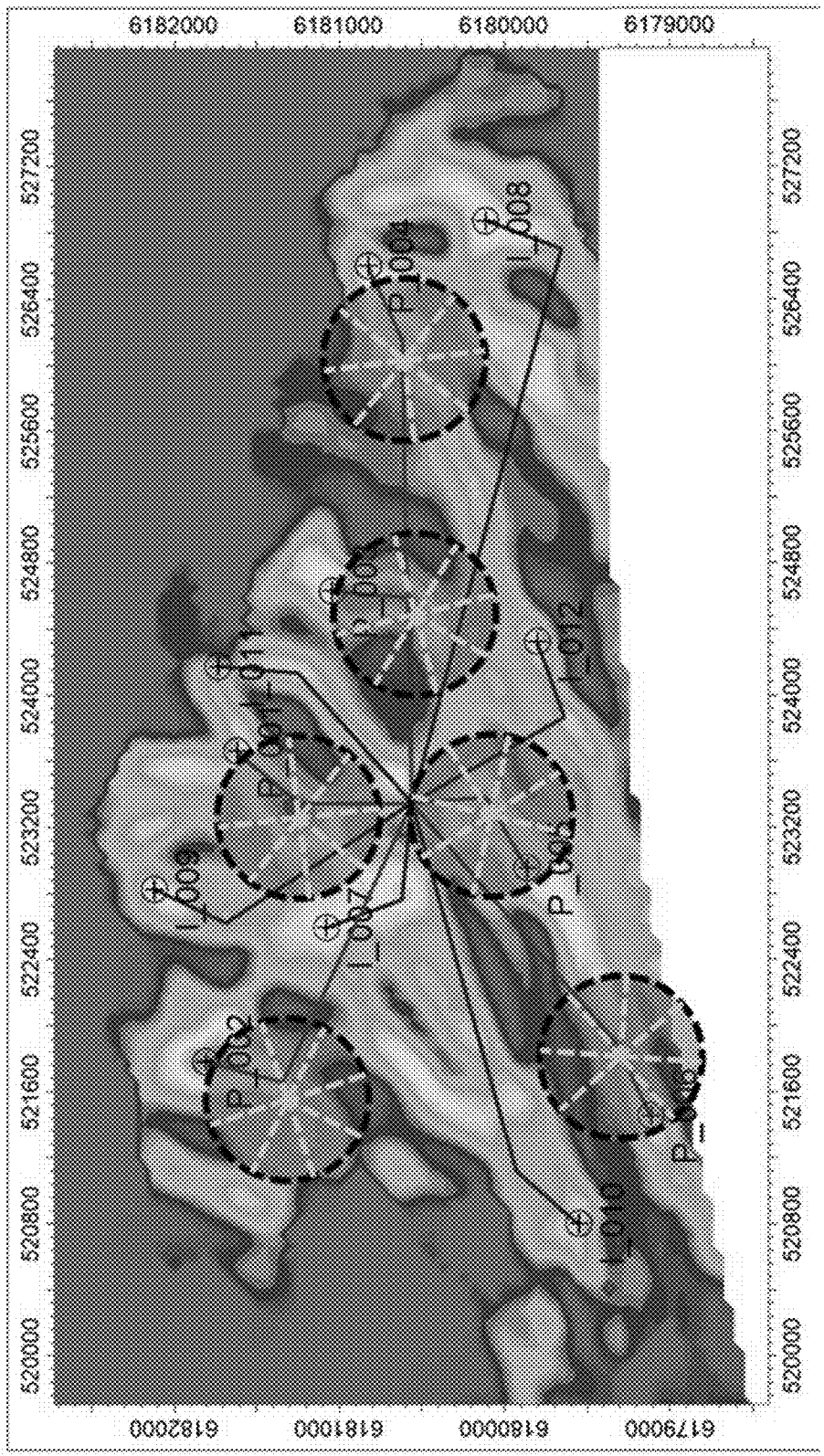
FIG. 4A is a graph illustrating how the black hole operator selects the location of the horizontal wells together with their optimal azimuth.

FIG. 4A is a graph showing the process through which wells are placed using the Black Hole optimizer for the Olympus Synthetic Field Case (Olympus Upper, Realization 22). PSO specifies the position of the $1^{st}$ well, the well spacing factor, the length of the horizontal section and the trajectory of the wells, and accordingly the Black hole operator specifies the location and azimuth of the remaining wells in cells having the maximum NHCT values in the updated NHCT map.

Figure 4C:
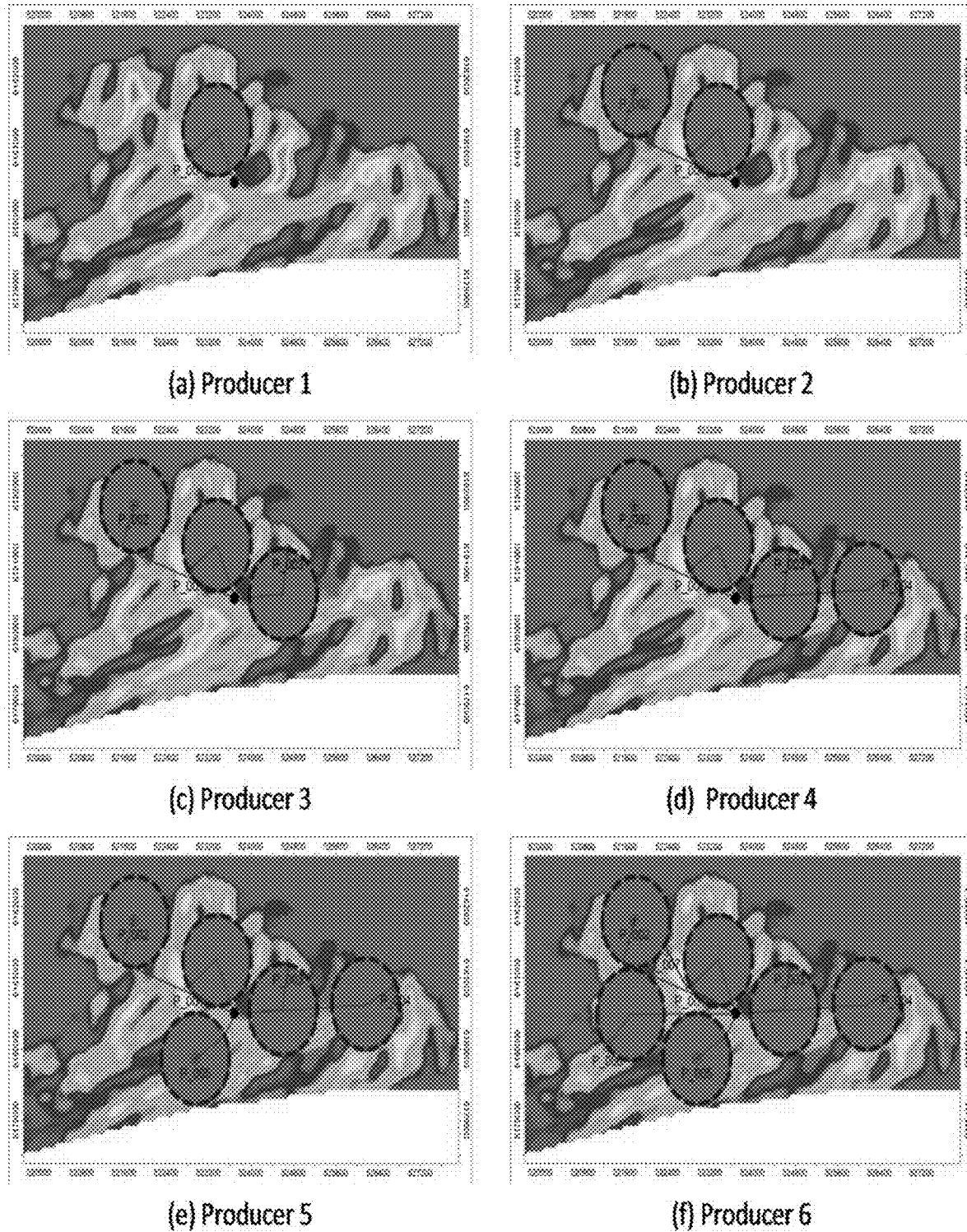
FIG. 4C is a graph illustrating the process through which wells drainage areas are eliminated when generating the production wells in preparation for generating the injectors. In this process, the radius used in this elimination is 1×TWS.
Figure 4D:
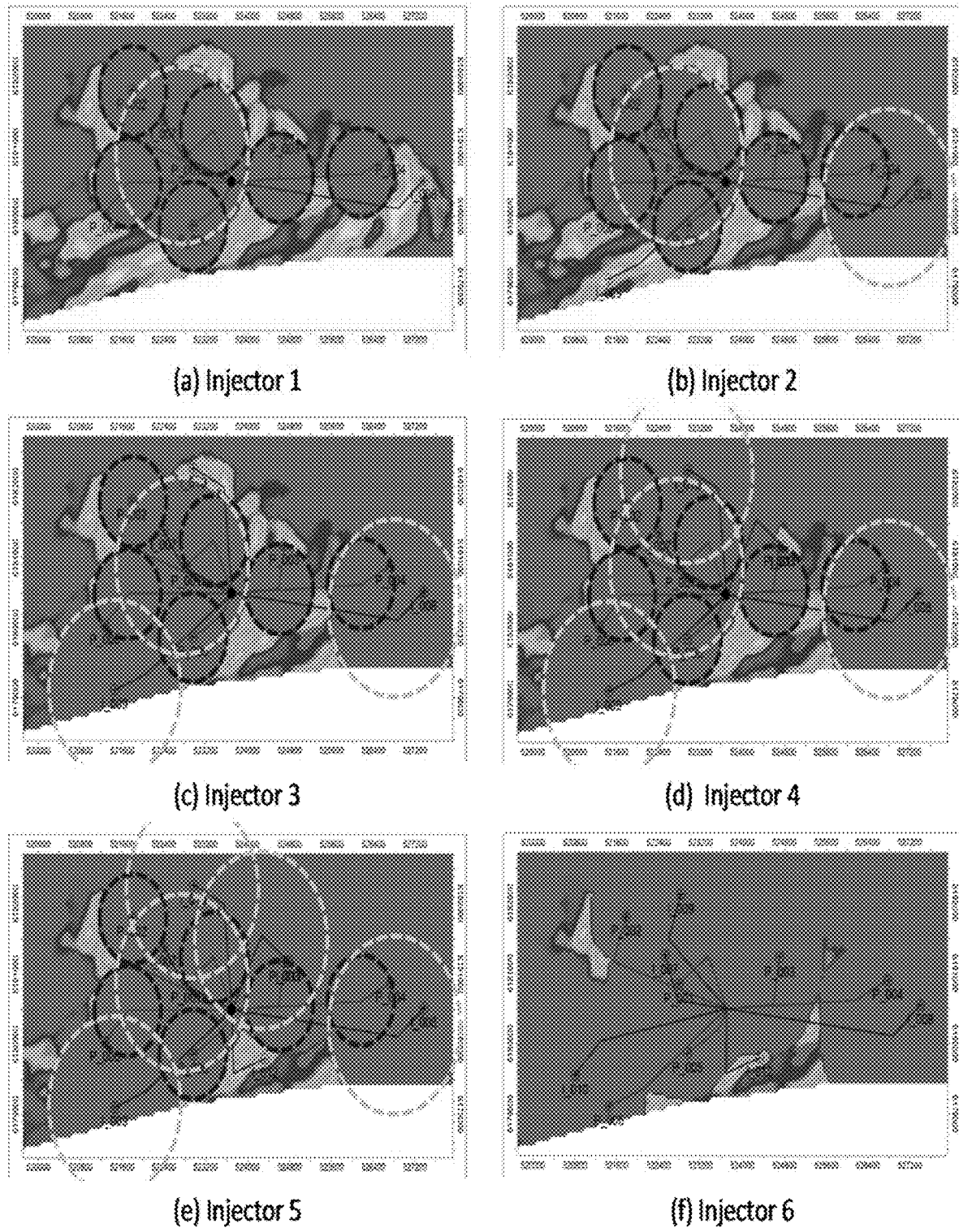
FIG. 4D is a graph illustrating the process through which injectors are generated based on altered net-thickness map following the producers generation. The radius used in this elimination is 2×TWS.
Figure 5B:
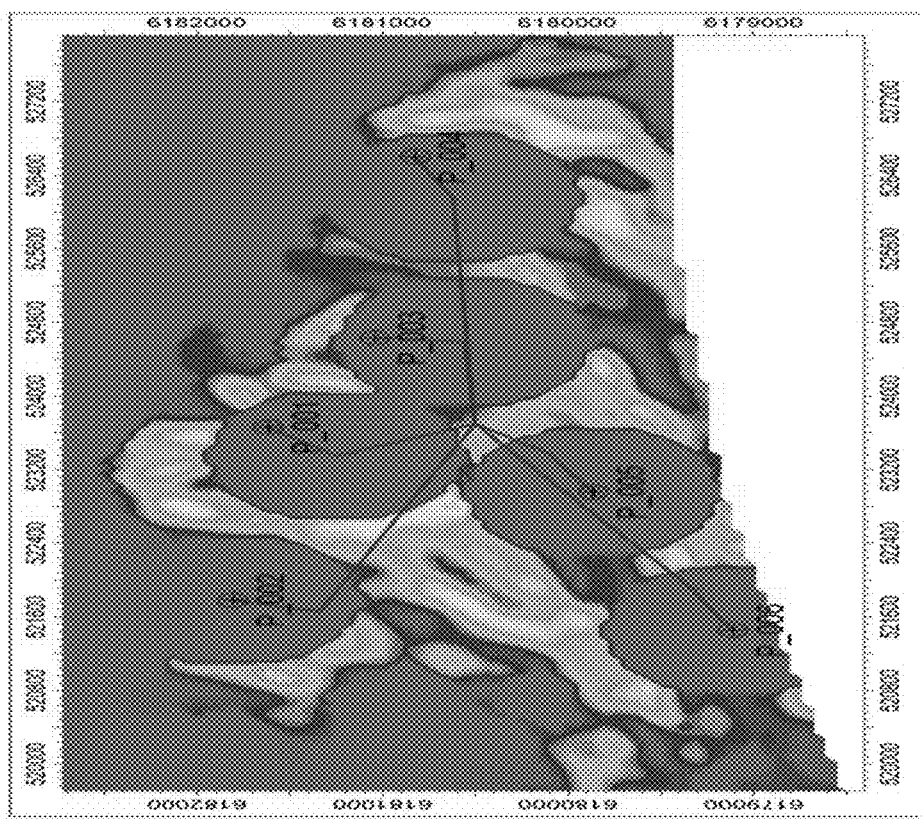
FIG. 5B is a graph showing the well placement on a NHCT map after Black Hole holing.
Figure 5A:
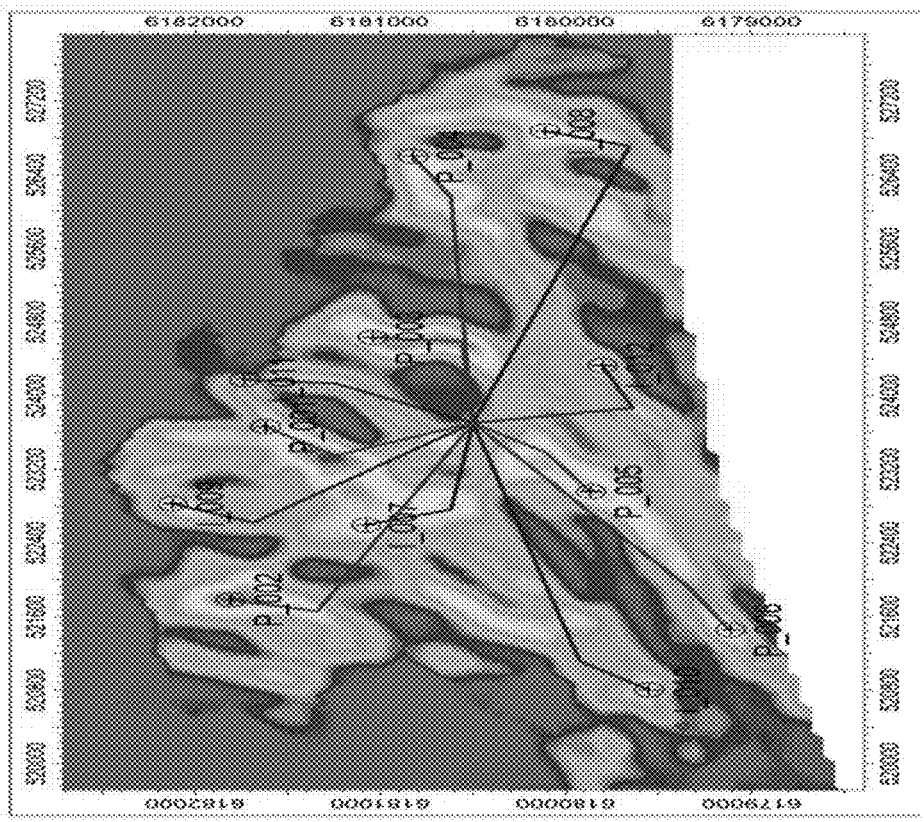
FIG. 5A is a graph showing the well placement on a NHCT map before Black Hole holing.

FIG. 4B is a graph illustrating the process through which wells drainage areas are eliminated when generating the production wells. In this process, the radius used in this elimination is 2×TWS. FIG. 4C is a graph illustrating the process through which wells drainage areas are eliminated when generating the production wells in preparation for generating the injectors. In this process, the radius used in this elimination is 1×TWS. FIG. 4D is a graph illustrating the process through which injectors are generated based on altered net-thickness map following the producers generation. The radius used in this elimination is 2×R. In this process, the radius used in this elimination is 2×TWS.

In one embodiment, algorithms & software for well placement optimization in oil and gas field development planning.

In one embodiment, implementation of the algorithms in commercial software that is used by practitioners reservoir engineers.

In one embodiment, BHPSO can be employed for the optimization of well placement in a field development plan. Specifically, it can "jointly" optimize the well count, location, type (injectors, producers), trajectory (vertical, horizontal), and horizontal section length. The used method makes the optimization problem "feasible" from a CPU point of view with the many parameters; that is unlike existing methods.

In one embodiment, the BHPSO approach makes the optimization workflow of the evolutionary algorithms independent of the number of wells involved in the field.

In BHPSO, a static optimizer named as the "Black Hole Operator" can work back to back with any evolutionary algorithm (e.g. GA and PSO). This optimizer drastically decreases the computational load of these algorithms by making their operation independent of the number of wells involved.

The algorithm/method has made the optimization process drastically faster allowing for several types of decision variable to be involved, and practically feasible for large scale field development projects.

The BHPSO algorithm/method was tested on the Olympus Field Development test, which aims at testing novel automated algorithms for field development optimization under uncertainty. The algorithm/method optimized the number, location, type, horizontal section, and trajectories of wells accounting for the subsurface uncertainty represented by the 50 geological realizations.

In one embodiment, a complex synthetic reservoir model, the Olympus, is used to test the BHPSO algorithm. The Olympus Field test is made up of 2 different geological zones separated by a non-permeable shale layer. This model consists of grid cells of approximately about 50 m×about 50 m×about 3 m each with a vertical resolution of about 16 layers. The model has approximately about 341,728 grid cells of which about 192,750 are active. In addition, about 50 sub-surface realizations were produced to account for the ranges of uncertainty on porosity, permeability, net-to-gross and irreducible water saturation. The complexity of this model has made this challenge representative of real life field development projects thereby making the testing and analysis of the optimization algorithms more robust.

In one embodiment, the Black Hole Optimizer (BHO) is a static optimizer that complements the PSO algorithm and enhances its performance in optimizing field development planning. The BHO starts from a net hydrocarbon thickness map (as a reservoir quality map) that acts as a guide for the BHPSO algorithm. The NHCT map is a "condensed" version of reservoir properties. It consolidates the information from porosity, permeability and hydrocarbon initially in place. For each cell in the aerial direction of a three-dimensional reservoir simulation model (i, j coordinates), the NHCT is calculated as following:

$$NHCT_{ij}=\Sigma_{k=1}^{N_k}\varphi_{ijk}NTG_{ijk}(1-Sw_{ijk})Z_{ijk} \quad (3);$$

where $\varphi_{ijk}$, $NTG_{ijk}$, $Sw_{ijk}$ and $Z_{ijk}$ denote the porosity, net-to-gross, water saturation and thickness of grid block cell ijk. Since $\varphi_{ijk}$, $NTG_{ijk}$ and $Sw_{ijk}$ are dimensionless, $NHCT_{ij}$ has the same unit as $Z_{ijk}$, that is meter (feet). $NHCT_{ij}$ is, generally, proportional to the following properties: Porosity and permeability. These petrophysical properties intervene directly in the formula and indirectly through the dependency of the water saturation function on porosity, permeability and rock quality index, in general.

Height above free water level. Here also, $Sw_{ijk}$ equals 1 below the free water level (FWL), the irreducible water saturation ($Swi_{ijk}$) high enough above the FWL and a value between 1 and $Swi_{ijk}$ in the transition zone.

FIG. 2 depicts example NHCT map. The red color indicates high NHCT, which is typically the best location to place a producer. On the other hand, the purple color depicts areas below the FWL or impermeable area (non-reservoir facies).

The use of NHCT map is very efficient for handling uncertainty. Different realizations due to uncertainty in reservoir properties can be represented by their corresponding NHCT maps which enables a practically feasible workflow to generate, when needed, well placement scenarios corresponding to different realizations in the process of a field development planning.

In the following embodiment, the process and method through which well placement optimization is performed using the black hole algorithm in one embodiment with at least two steps:
1. Horizontal wells with a predefined horizontal section length ($Hz_L$).
2. Pattern water injection with an injector to producer ratio of one ($IP_R$).

In the following embodiment, the method considers the following factors:
1. The case of vertical well is a particular and simpler case of horizontal wells in the context of the embodiments disclosed herein.
2. The algorithm can address any value of $IP_R$. The value of "one" selected in this embodiment is for illustration purposes only.
3. The case of peripheral water injection is addressed separately as it requires the simultaneous use of two different maps.

The BHPSO algorithm and method generates ready to be used wells trajectories; for reservoir simulation purposes in one embodiment. Below are the input data and parameters to the BHPSO algorithm and method:
1. The NHCT map ($NHCT_{map}$) is built using a pre-processor, according to one embodiment. The NHCT map may be generated from the reservoir model; fine (geocelluar) grid or upscaled dynamic grid.
2. A structured map ($Horizon_{map}$) representing the horizon/depth in which the horizontal section to be placed. Typically, the layer containing the largest quantity of hydrocarbon initially in place could be selected to generate the horizon. However, different Horizon maps can be used for placing the horizontal sections of producers and injectors. Furthermore, in a sensitivity analysis process, different depth (and hence Horizon maps) can be tested to select the optimal one; according to one embodiment, that resulting in the highest cumulative oil.
3. Number of producers and number of injectors, $N_P$ and $N_{WI}$, respectively.
4. Horizontal well section length, $Hz_L$.
5. Well spacing (that is the radius of the disk around the wells as illustrated in FIG. 4A), $R_D$. The well spacing controls the maximum number of wells that can be placed based on a given map. In such a case, $N_P$ and $N_{WI}$ become maximum number of wells that cannot be exceeded. This is not the case in the combined BHPSO where the Technical Well Spacing is introduced as optimization parameter which is calculated based on the number of wells involved and, hence, ensuring there is always be a space for any prescribed number of wells to be involved.
6. Increment to be used in optimizing the well azimuth, $\delta_{Azimuth}$. Minimum and maximum radius limits can be provided to restrict the well azimuth (based on geomechanics considerations and or major fault orientation for some embodiments).
7. Minimum distance between wells, $D_{min}$: A parameter that controls the optimization of the well azimuth and, potentially the total number of wells. For instance, in case $R_D=HZ_L$, this parameter limits the well azimuth optimization and keeps the wells toes from potentially colliding through keeping the distance between them larger or equal to $D_{min}$.

For programming embodiments, the map is list of points each having the following items: $i_x$, $j_y$, x, y and value based on a corner-point grid. Below, the BHPSO algorithm and method as applied for pattern water injection case.

In this embodiment, the process through which producers placement is performed using the BHPSO algorithm:
The BHPSO algorithm/method starts by first placing the $N_P$ (p=1, ..., $N_P$) producers
1. Copying $NHCT_{map}$ in a temporary map c
2. Copying $NHCT_{map}$ in a temporary map $NHCT_{map\_temp\_inj}$
3. Creating the producers heels/toes: For p=1, $N_P$
   a. Finding the point with the highest NHCT in $NHCT_{map\_temp\_prod}$. Letting $Point_{opt}$ denote the identified point. In case $NHCT_{map\_temp\_prod}$ does not have, anymore, points with a value>value_cuttoff, exit the loop.
   b. Placing producer p at $Point_{opt}$, which may represent the heel or the toe of the well (depending, for one embodiment, on the platform location in an offshore development planning problem).
   c. Eliminating a disk of centre $Point_{opt}$ and radius $2 \times R_D$ from $NHCT_{map\_temp\_prod}$. In one embodiment, that is equivalent at setting value=0 for every point within this disk.
   d. Eliminating a disk of centre $Point_{opt}$ and radius $1 \times R_D$ from $NHCT_{map\_temp\_inj}$.
   e. Providing $N_{P\_max}$=P
4. For generating the Horizontal sections and optimizing their azimuth: For p=1, $N_{P\_max}$; the following steps are conducted by the BHPSO:
   a. Creating the horizontal section of p based on any predefined Azimuth. This section is made of a large number of "connections" to enable the horizontal section to smoothly follow the $Horizon_{map}$. Letting $N_{Connections}$ denote the total number of connections per well.
   b. Calculating the cumulative NHCT, $NHCT_{cumulative}$ for well p by summing up the NHCT for every "cell" in the map crossing one of the well's connections.
   c. Providing $Azimuth_{opt}$=Azimuth
   d. Providing Angle=0. While Angle<360° is given by:
      i. Providing $Azimuth_{temp}$=Azimuth+$\delta_{Azimuth}$
      ii. Calculating the cumulative NHCT, $NHCT_{cumulative\_temp}$, corresponding to $Azimuth_{temp}$.
      iii. If the two following conditions are True:
         1. The entire well falls within the map, that is no connections of the well correspond to undefined map points for $Azimuth_{temp}$
         2. $NHCT_{cumulative\_temp}$>$NHCT_{cumulative}$
         Then: $Azimuth_{opt}$=$Azimuth_{temp}$.
      In the embodiment of producers only (no injectors), $Azimuth_{opt}$=$Azimuth_{temp}$ only if the distance between any connection of well p for $Azimuth_{temp}$ and any connection of any other placed well is larger than $D_{min}$. That is on top of the two above conditions 1 and 2.
      iv. Providing Angle=Angle+$\delta_{Azimuth}$
   e. Re-creating the horizontal section using $Azimuth_{opt}$. When it comes for the depth at which the horizontal section is landed, any default value can be given at this stage.
5. Landing the producers' horizontal sections in the right depth. For p=1, $N_{P\_max}$
   a. Providing for connection c=1, $N_{Connections}$ of well p
      i. Locating the "cell" in $Horizon_{map}$ that corresponds to this connection.
      ii. Changing the depth of connection c to correspond to the cell's centre.

The process through which wells' drainage areas (Disks) are eliminated from $NHCT_{map\_temp\_prod}$ when generating the production wells is illustrated in FIG. 4B. Similarly, FIG. 4C illustrates the process through which wells' drainage areas are eliminated from $NHCT_{map\_temp\_inj}$ when generating the production wells in preparation for generating the water injectors.

In the following embodiment, the process through which water injectors placement is performed using the BHSPO algorithm is enabled.

The $N_{wI}$ water injectors (wi=1, . . . , $N_{WI}$) placements follows the process through which water injectors are placed is identical to that described in Steps 3, 4, and 5 above with the following differences: 1. $NHCT_{map\_temp\_inj}$ resulting from the above Step 3 is used as a starting point. That is, disks of radius $1 \times R_D$ around all producers have been already removed.

2. In Step 4.d.iii, providing $Azimuth_{opt}$=$Azimuth_{temp}$ only if the distance between any connection of well p for $Azimuth_{temp}$ and any connection of any other placed well is larger than $D_{min}$.

The above described process for water injectors is depicted in FIG. 4D.

In the following, the process through which well placement is performed in a peripheral water injection scheme is enabled.

Figure 13:
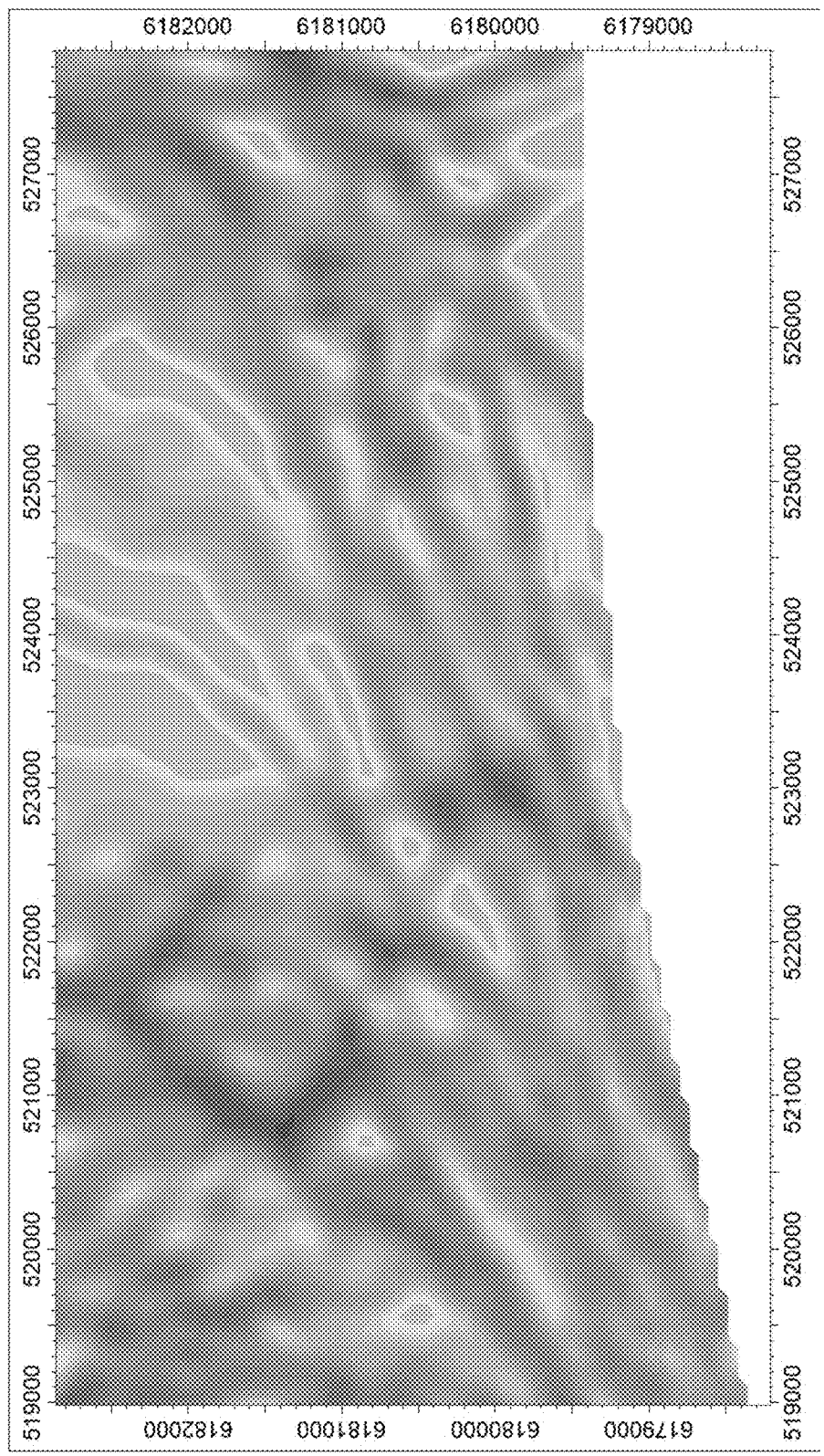
FIG. 13 is a graph showing a Kh map which is used as the guide for the water injection wells placement in a peripheral water injection scheme.

While the NHCT is ideal for producers placements or injectors in a pattern based water injection scheme, the "Kh" map is more suited for water injector placement in a peripheral water injection process. For each cell in the aerial direction of a three-dimensional reservoir simulation model, the Kh is calculated as following:

$$Kh_{ij} = \sum_{k=1}^{N_k} k_{ijk} Z_{ijk}; \quad (4)$$

where $k_{ijk}$ denotes the (aerial) permeability of grid block cell ijk. FIG. 13 depicts example Kh map.

In one embodiment, the algorithm used to generate wells in this scenario with a focus on the differences compared to pattern water injection is enabled below. Two maps are used for the purpose: the NHCT map is used to generate the producers while the Kh map is used to generate the injectors.

In the following embodiment, the process through which producers placement is performed in a peripheral water injection scheme is enabled.

The process through which producers are placed in this embodiment is identical to that described in Steps 3, 4, and 5 for producers placement in a pattern injection scheme with the following differences:

Providing $NHCT_{map\_temp\_inj}$ is not used.

Providing the disk eliminated from $NHCT_{map\_temp\_prod}$ in Step 3.c is of radius $1 \times R_D$ In Step 4.d.iii, providing $Azimuth_{opt}$=$Azimuth_{temp}$ only if the distance between any connection of well p for $Azimuth_{temp}$ and any connection of any other placed well is larger than $D_{min}$.

In the following embodiment, the process through which water injector placement is performed in a peripheral water injection scheme is enabled.

Providing the Kh map, $Kh_{map}$ used in this part is a "ring" through which injectors are placed in a similar way they are placed in the case of pattern water injection. Dictating their placement by $R_D$, $D_{min}$ and $\delta_{Azimuth}$. The same drivers used in the case of pattern water injection ensure that wells are optimally distributed following $Kh_{map}$. This is illustrated in the embodiment in the following section.

In the following embodiment, the process for "fenced" areas while optimizing well placement using BHPSO is enabled.

Any area to be excluded ("fenced" area) when planning for a well placement is straightforwardly accounted for through "zeroing" the $NHCT_{map}$ around these areas prior to starting the well placement process. Fenced areas include, for instance, minimum distance from existing wells and faults.

In the following embodiment, the process through optimization parameters are initialized in BHPSO is enabled. The PSO algorithm initializes the solution vector of the Black Hole operator. The solution vector includes five parameters that can be categorized into Discrete parameters, a continuous parameter, and a binary parameter.

Discrete parameters comprise the following:
b. Providing a row index of the i and j coordinates of the first well on the $NHCT_{map\_prod}$ in the case of a vertical well.
c. Providing a row index of the i and j coordinates of the first well toe/heel on the $NHCT_{map\_prod}$ in the case of a horizontal well
d. Providing a Well count defined by a number between a predefined minimum and maximum.
e. Providing a horizontal section length (in the case of a horizontal well), $L_{Hz}$: A number between a predefined minimum and a maximum.

Continuous parameter comprises the following:
b. Providing a well spacing factor (F) defined by adimensionless parameter between 1 and 2. The use of this parameter in the optimization algorithm is defined in section 2.3.4.

Binary parameter comprises the following:
b. Providing a well trajectory: "0" represents a vertical trajectory and "1" represents a horizontal trajectory.

While the convergence criteria are not met, the well placement optimization parameters are updated through the following steps.

In the following embodiment, the process through which the first well is placed in BHPSO is enabled.

Figure 12:
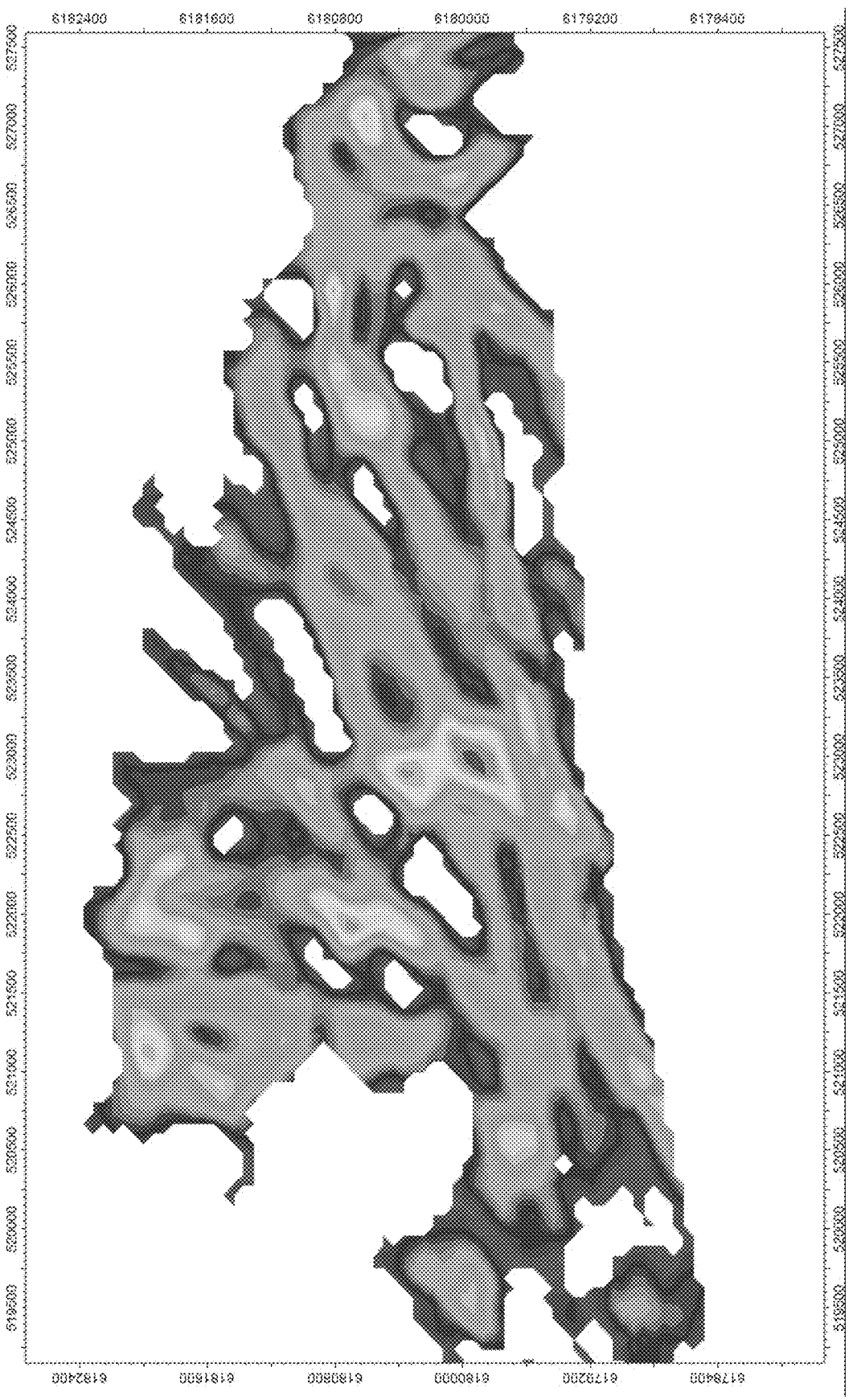
FIG. 12 is a graph showing a predefined cutoff is applied to constrain the placement of the first producer to be above the oil-water contact in a high permeability area as it is being stochastically updated by PSO.

This is the only well that is placed by PSO which makes the whole process independent of the number of wells and hence is the drastic efficiency of the proposed method. PSO selects the well location (i and j coordinates) based on results from previous iterations. Once selected, BHO eliminates a disk "Black Hole" from the $NHCT_{map\_prod}$ around the selected location with a radius equals to $2 \times TWS$, where TWS is the Technical Well Spacing. TWS is used for BHPSO exclusively to ensure a place for all wells on the $NHCT_{map\_prod}$ and is defined by: TWS=

$$\sqrt{\frac{A_r}{2\pi N_w}F}; \quad (5)$$

where $A_r$, $N_w$ and F denote, the total $NHCT_{map\_cuttoff}$ area, the number of wells, and the "well spacing factor", respectively. Providing the $NHCT_{map\_cuttoff}$ is a cut-off $NHCT_{map}$ at a value of 2 m to reduce the search area for the optimization algorithm (FIG. 12). In one embodiment, the $NHCT_{map\_cuttoff}$ is only used for the placing the first well which is always a producer. F is a multiplier introduced to the technical well spacing formula to enable variability and flexibility in the selection of the optimal horizontal well length and distance between wells. Simultaneously, BHO eliminates a "Black hole" from the $NHCT_{map\_inj}$ with a radius equal to TWS to enable optimal well placement of injectors.

In the following embodiment, the process through remaining wells are placed in BHPSO is enabled.

The remaining wells (whose number is decided by PSO) are placed by BHO, sequentially, using the $NHCT_{maps}$. The operator picks the location of the next producer or injector based on the maximum NHCT value on the relevant blackholed maps, (NHCT$_{map\_prod}$) for producers and NHCT$_{map\_inj}$ for injectors. First, the black hole operator places the producers, one by one, while blacking the NHCT$_{map\_prod}$ with a radius of 2×TWS and the NHCT$_{map\_inj}$ with a radius 1×TWS around the location of the placed producers. Then, after placing all the producers, the injectors are placed, one by one, while blacking again the NHCT$_{map\_inj}$ with a radius of 2×TWS around the location of the placed injectors. This ensures a pattern-like injection scheme where there is at least an injector optimally placed between any two producers. In one embodiment, the producers are placed first to give them priority on areas with highest NHCT values.

In the following embodiment, the process through which horizontal well azimuths are optimized in the in BHPSO is enabled.

BHO provides the core algorithm (PSO) with the option to alter the trajectory type (horizontal vs. vertical wells). The trajectory option is a binary variable where all wells are either horizontal or vertical. For horizontal trajectory, after locating the toe (same as vertical trajectory discussed above), BHO assesses the NHCT corresponding to different azimuths as illustrated in FIG. 4A and selects the azimuth crossing through the cells having the maximum cumulative NHCT. In one embodiment, the horizontal wells are placed in specified vertical layers and their length is an optimization parameter that is altered by PSO. In this embodiment, an increment of about 45 degrees may be chosen. However this number is a user-set parameter that can be changed to any other value, such as between about 5 degrees and about 350 degrees.

As for vertical trajectory, wells are chosen to be fully penetrating all the layers.

In the following embodiment, the process through which swarm evaluation and algorithmic parameters update take place in BHPSO is enabled.

Each PSO iteration holds several particles or "simulation cases" in which their optimization parameters are updated at each iteration. The simulation results are fed into an operator that updates the position and velocity of each particle. The updated position of each particle defines the values of the parameters of the next iteration in the optimization process. The process re-iterates until convergence criteria is met.

In the following embodiment, the validation of the proposed optimization Method—BHPSO vs. PSO is enabled.

A comparative study was conducted to demonstrate the advantages of combining the BH operator with evolutionary algorithms; PSO in this work. This study entails a three dimensional sensitivity analysis for comparing the performance of PSO and BHPSO algorithms in relation to problem complexity, swarm size and stochastic nature of the core algorithm. Thus, the size of the search space, and the amount of computational load vary for the different sensitivities.

In all sensitivities, the same algorithmic parameters and neighborhood topology (star topology) are used for the core optimizer (PSO algorithm) of both algorithms. Furthermore, both algorithms were initialized in each sensitivity with the same initial solution using the BH operator and run for a fixed number of iterations (30 iterations). The NPV was used as the objective function and computed using Eq. 6. The reservoir of interest for the validation purpose is Olympus Upper, Realization 22. Some of the optimization parameters are excluded in this study since it was practically infeasible to optimize them using the standard PSO; which is not the case of BHPSO.

In the following embodiment, the validation of the proposed optimization Method—BHPSO vs. PSO—Sensitivity 1—Problem Complexity is enabled.

BHPSO and PSO were applied to two optimization problems with different levels of complexity. Problem 1 entails the optimization of the location of 6 vertical wells. In this problem, the PSO is optimizing 6 decision variables (e.g. 6 row indices of x,y coordinates) while the BHPSO is optimizing only two decision variables (e.g. first well index of x,y coordinates and well spacing factor (F)). On the other hand, Problem 2 involves the optimization of the location and azimuth of 12 horizontal wells of a fixed horizontal section length (500 m). PSO, in Problem 2, is optimizing 24 decision variables (e.g. 12 row indices of x,y coordinates and 12 well azimuths) while BHPSO on the other hand, is optimizing only two decision variables (e.g. first well index of x,y coordinates and well spacing factor (F)). This reduction in the number of decision variables is induced by the BH operator which is taking a major part of the optimization load. Furthermore, in both problems, the optimization run of each algorithm was repeated three times and average NPV was generated for comparison. FIG. 3A illustrates the progression of the NPV for both algorithms in the selected simulation problems.

In Problem 1 (FIG. 3A, left), BHPSO systematically outperforms the standard PSO in all three trials. BHPSO shows a better tendency in avoiding local optima traps making its progression more efficient than that of the PSO. The NPV with BHPSO reaches an average of 561 million US dollars (MM US$) while the average for PSO is 470 MM US$; 19% less than the result of the BHPSO. On average, BHPSO achieved a 40% improvement over its first trial while PSO has achieved a 17.5% improvement over the same first trial. Furthermore, unlike PSO, BHPSO has a consistent performance over the 3 trials where there is a minimal difference in the reached optimal values compared to those reached by PSO.

Problem 2 (FIG. 3A, right) involves a new type of decision variable, the azimuth of the horizontal section of the well, which made it a more complex problem than Problems 1. As expected, BHPSO is drastically outperforming the PSO in this problem. Similar to Problems 1, trials of BHPSO are converging faster than those with PSO. BHPSO reaches an average optimal value of 813 MM US$ that is higher than that reached by PSO (720 MM US$). On average, BHPSO achieved a 53.3% improvement vs. its initial trial while PSO achieved a 36.5%. The complexity of this problem has slightly affected the consistency of BHPSO performance as a difference between the optimal values of different trials is seen; however, this difference is relatively minimal (5%). The convergence factor of BHPSO is addressed with neighborhood topologies and algorithmic parameters of the core optimizer (PSO).

In the following embodiment, the validation of the proposed optimization Method—BHPSO vs. PSO—Sensitivity 2—Number of Particles is enabled.

Considering the difference in the number of decision variables between the two algorithms, it was decided to investigate the effect of the swarm size on the algorithms performance. Thereby, in this sensitivity, BHPSO and PSO were employed for Problem 1 with two different swarm size; 15 and 20 particles. At both swarm sizes, both algorithms were initialized with same initial solution that was used for Problem 1 in sensitivity 1 and their optimization run was repeated three times. FIG. 3B illustrates the progression of the NPV for both algorithms at different swarm sizes.

Similar to observations in sensitivity 1, BHPSO is outperforming PSO in all optimization runs. With 15 particles (FIG. 3B, left), the NPV with BHPSO reaches an average of 567 million US dollars (MM US$) while the average for PSO is 482 MM US$; 17.6% less than the result of the BHPSO. On the other hand, with 20 particles (FIG. 3B, right), the NPV with BHPSO reaches an average of 574 million US dollars (MM US$) while the average for PSO is 492 MM US$; 16.6% less than the result of the BHPSO. Relative to results of Problem 1 in sensitivity 1, the convergence rate of BHPSO is drastically improving. With 10 particles in Sensitivity 1 (FIG. 3A, left), BHPSO is reaching a near optimal value in 20 iterations whereas with 15 and 20 particles in sensitivity 2 (FIG. 3B), BHPSO is nearly converging at 10-12 iterations. Furthermore, observing the final results for 10 particles in Sensitivity 1 (FIG. 3A, left) and for 15 and 20 particles (FIG. 3B) in Sensitivity 2, a minimal improvement of PSO relative to BHPSO is seen. With further increase in the swarm size, this improvement grows; however, according to results, it requires a large swarm size to meet the performance of BHPSO. More difficulty arises when the problem is more complex and include a larger number of decision variables.

In the following embodiment, the validation of the proposed optimization Method—BHPSO vs. PSO—Sensitivity 3—Stochastic Nature is enabled.

In sensitivities 1 and 2, optimization runs were repeated only three times and was deemed sufficient for the purpose of each sensitivity, however such number could be considered insufficient to compare both algorithms in relation to the stochastic nature of the core algorithm. Thereby, in this sensitivity, Problem 1 was repeated ten times and the average NPV was used for comparison between the two algorithms. FIG. 3C illustrates the progression of the NPV of 10 optimization runs for both algorithms along with their average.

As expected, BHPSO is also outperforming PSO in all optimization runs. Similar to the results attained in Problem 1, the NPV with BHPSO reaches an average of 561 million US dollars (MM US$) while the average for PSO is 475 MM US$; 18.5% less than the result of the BHPSO. On average, BHPSO achieved a 40% improvement over its first trial while PSO has achieved a 17.5% improvement over the same first trial. Once again, BHPSO shows consistency in the final results as there is a minimal difference (3%) between the maximum and the minimum trials unlike PSO where the difference reached 18%.

Figure 1C:
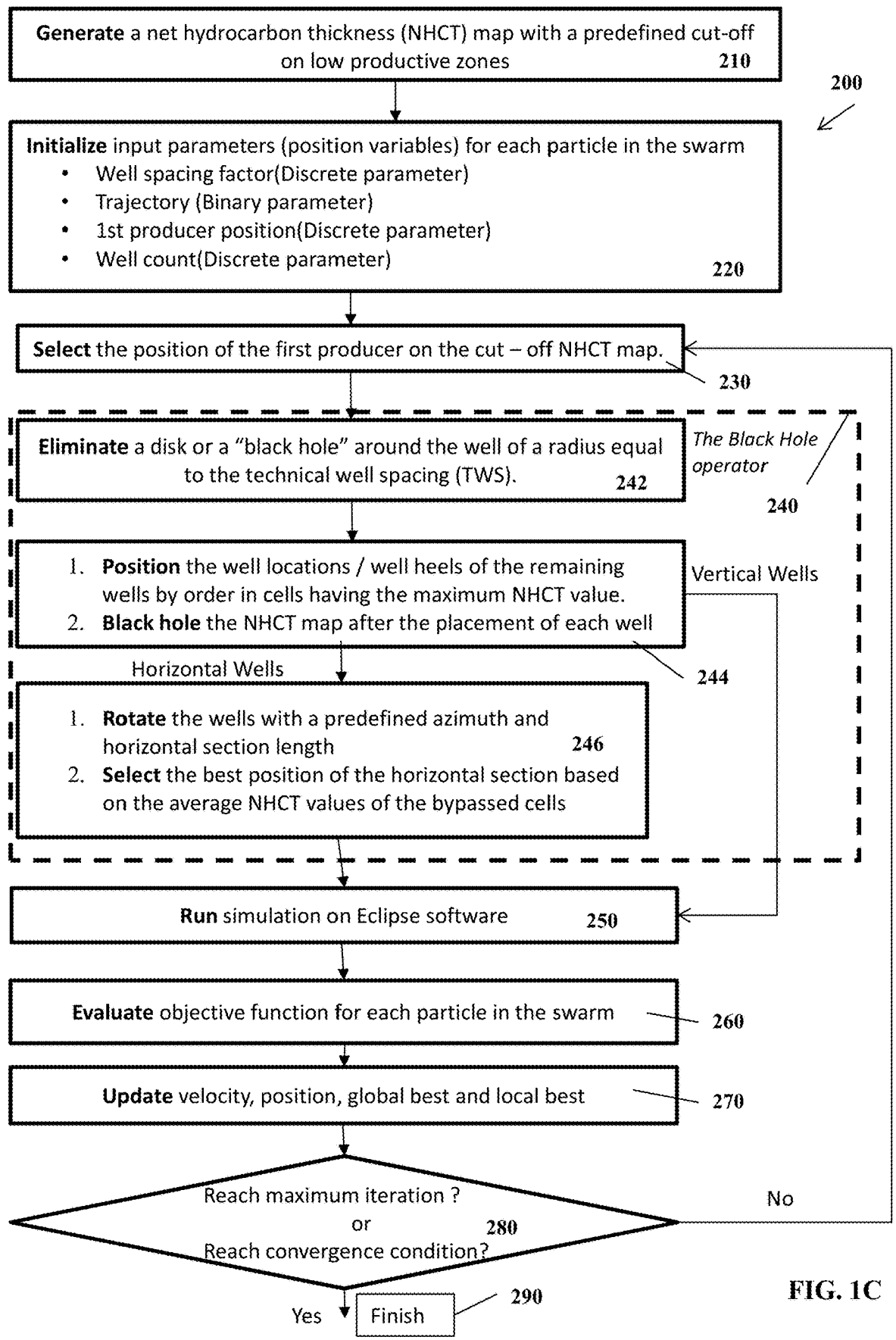
FIG. 1C is a schematic flow chart of the Black Hole Particle Swarm Optimization for Optimal Well Placement in Field Development Planning, according one embodiment.

As shown in FIG. 1C, another embodiment of the Black Hole Particle Swarm Optimization for Optimal Well Placement 200 comprises a first step 210 generating a net hydrocarbon thickness (NHCT) map with a predefined cut-off on poor reservoir properties areas. The second step 220 is initializing a plurality of input parameters (position variables) for each particle in the swarm, where the plurality of input parameters include, but are not limited a Well spacing factor (Discrete parameter), a Trajectory (Binary parameter), a 1st producer position (Discrete parameter), and a Well count (Discrete parameter). The third step 230 is selecting the position of the first producer on the cut-off NHCT map. The cutoff is what constrains the positioning of the $1^{st}$ well and its effect on the algorithm performance. Then, the Black Hole operator 240 is deployed and comprises fourth step 242 eliminating a disk or a "black hole" around the well of a radius equal to the technical well spacing (TWS). The Black Hole Operator comprises a fifth step 244 of positioning the well locations/well heels of the remaining wells by order in cells having the maximum NHCT value and then creating a black hole the NHCT map after the placement of each well. And then either horizontal wells or vertical wells are created. The Black Hole Operator comprises a sixth step 246 for the horizontal wells comprising rotating the wells with a pre-defined azimuth and horizontal section length; and then selecting the best position of the horizontal section based on the average NHCT values of the bypassed cells. If vertical wells are created, then the Black hole operator is completed and proceeds to seventh step 250 of running a simulation on Eclipse software. Once the horizontal wells are created, then the Black hole operator is completed and proceeds to running a simulation on Eclipse software in the seventh step 250. Step eight 260 comprises evaluating an objective function for each particle in the swarm. Step nine 270 comprises updating the velocity, position, global best, and local best. Step ten 280 comprises a decision step to determine whether a maximum iteration is reached or if a convergence condition is reached. If either maximum iteration is reached or if a convergence condition is reached, then the program is finished 290. If either maximum iteration is not reached or if a convergence condition is not reached, then it proceeds back to the third step 230 of selecting the position of the first producer on the cut and proceeding to the Black Hole Operator 140.

Eclipse software is an integrated development environment (IDE) used in computer programming, and is the most widely used Java IDE. It contains a base workspace and an extensible plug-in system for customizing the environment. Eclipse is written mostly in Java, but it may also be used to develop applications in other programming languages via plug-ins, including Ada, ABAP, C, C++, C #, COBOL, D, Fortran, Haskell, JavaScript, Julia, Lasso, Lua, NATURAL, Perl, PHP, Prolog, Python, R, Ruby (including Ruby on Rails framework), Rust, Scala, Clojure, Groovy, Scheme, and Erlang. Development environments include the Eclipse Java development tools (JDT) for Java and Scala, Eclipse CDT for C/C++, and Eclipse PDT for PHP, among others.

Results

Upper→Realization 22 and Lower→Realization 6.

Figure 7B:
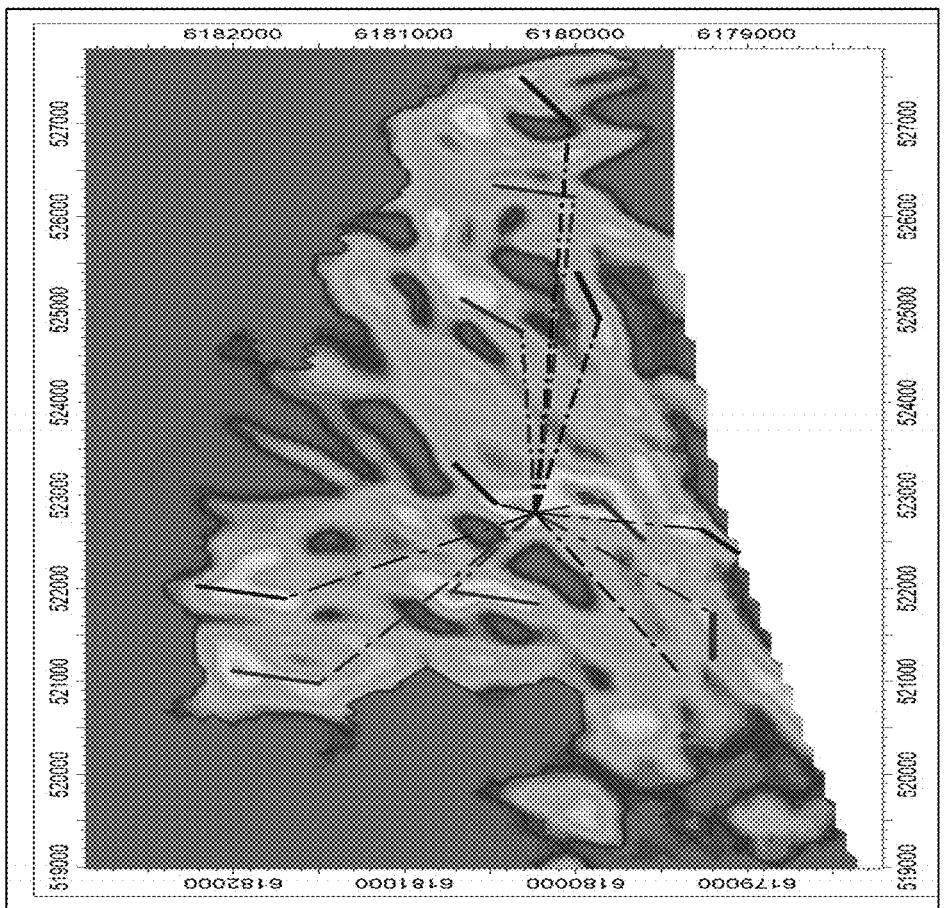
FIGS. 7A-7B are graphs showing the results of the BHPSO on the well placement optimization of the Olympus oil field, upper reservoir, sub-surface realization 22. Number of wells=12 with a horizontal section of 500 m. Net Present Value=9.4 MM $. Cumulative Oil production=9 MM m3 (32.5%). Convergence is achieved with 12 iterations. 50% improvement in terms of Net Present Value compared to 1st iteration.
Figure 7A:
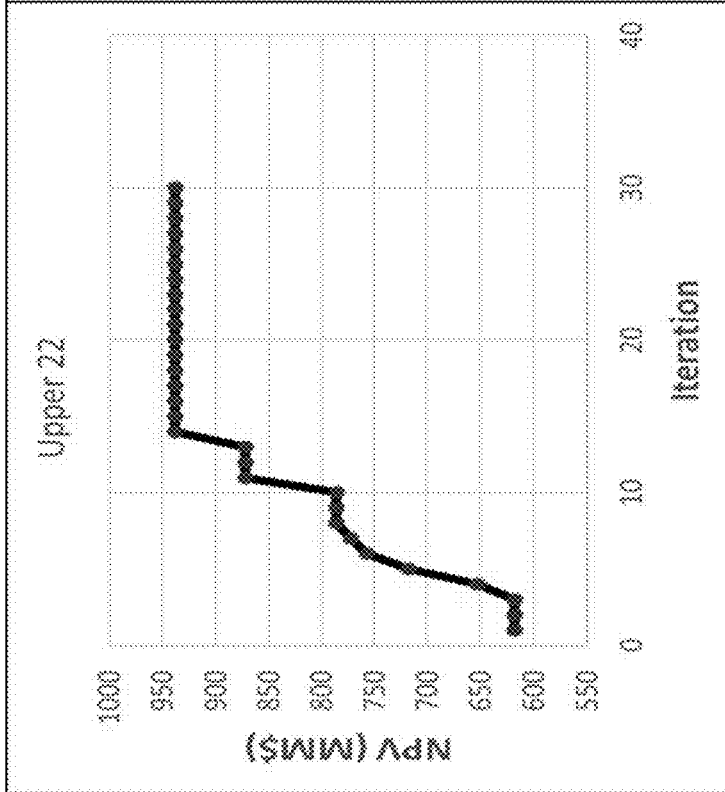

FIG. 7A-7B is a graph showing the summary of the results for the algorithm to Upper 22, an NPV of 9.4 MM and a cumulative oil production of 9 MM m$^3$ leading to a 32.5% recovery is achieved with the BHSPO. Convergence ~12 iterations, 50% improvement from 1st iteration, Number of wells ~12 (Horizontal section ~500 m).

Figure 8B:
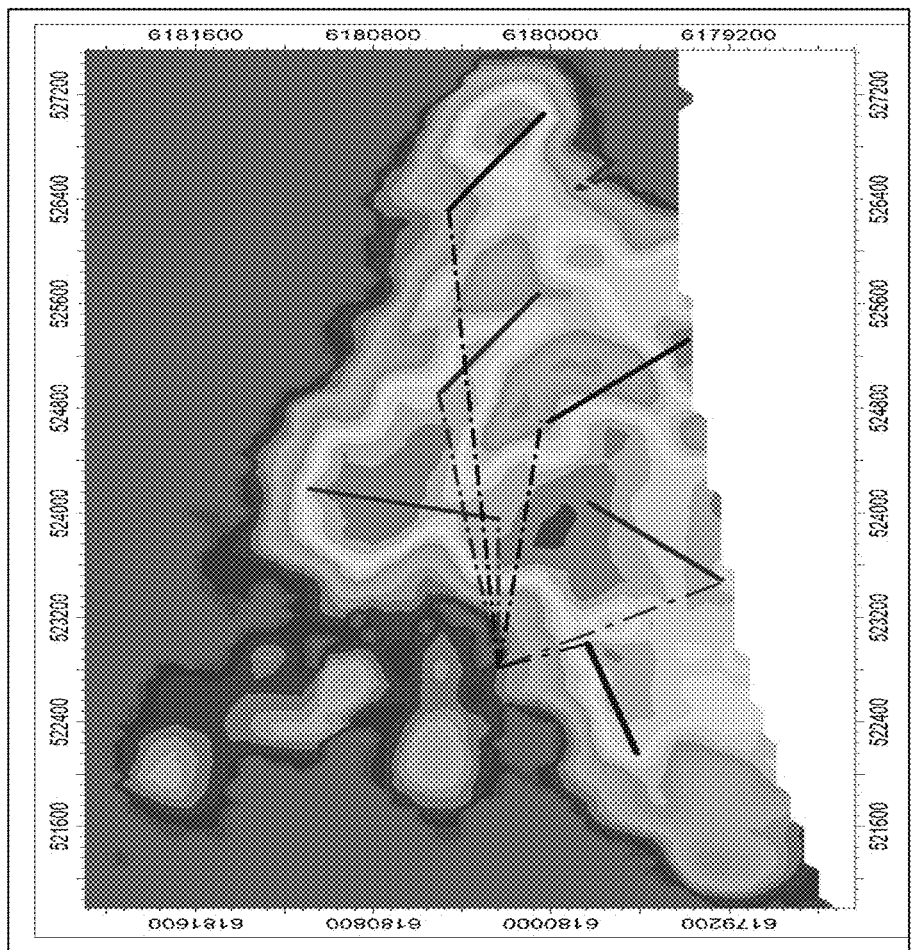
FIGS. 8A-8B are graphs showing the results of the BHPSO on the well placement optimization of the Olympus oil field, lower reservoir, sub-surface realization 6. Number of wells=6 with a horizontal section of 800 m. Net Present Value=5.9 MM $. Cumulative Oil production=5.2 MM m3 (28.6%). Convergence is achieved with 9 iterations. 25% improvement in terms of Net Present Value compared to 1st iteration.
Figure 8A:
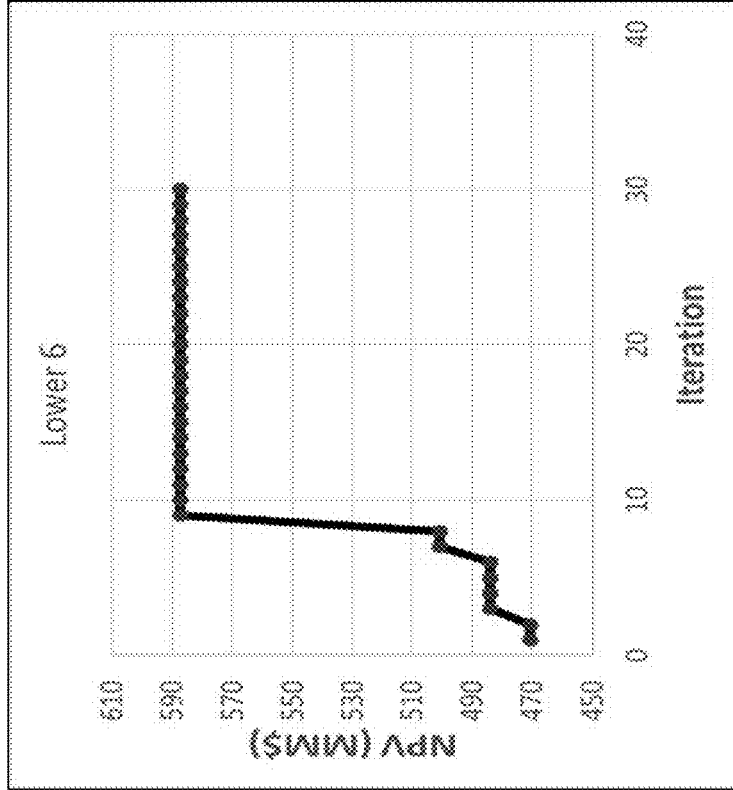

FIGS. 8A-8B shows the summary of Results—Lower 6 NPV=5.9 MM $, Cumulative Oil production=5.2 MM m3 (28.6%), Convergence ~9 iterations, 25% improvement from 1st iteration, Number of wells ~6 (Horizontal section ~890 m) for the BHSPO.

Figure 9:
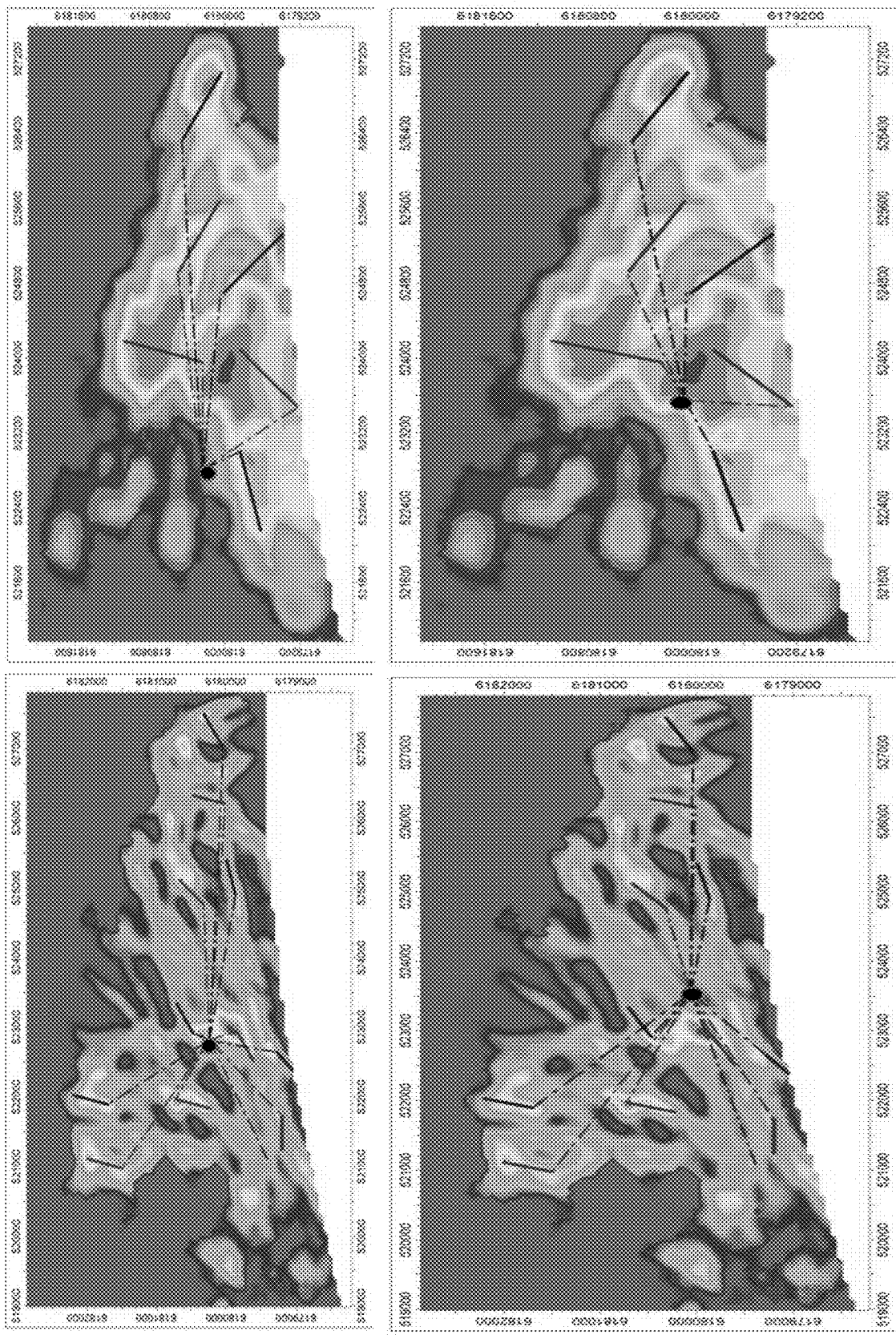
FIG. 9 is a graph showing the Summary of Results—Platform Location

FIG. 9 is graph showing the summary of Results—Platform Location.

Figure 10:
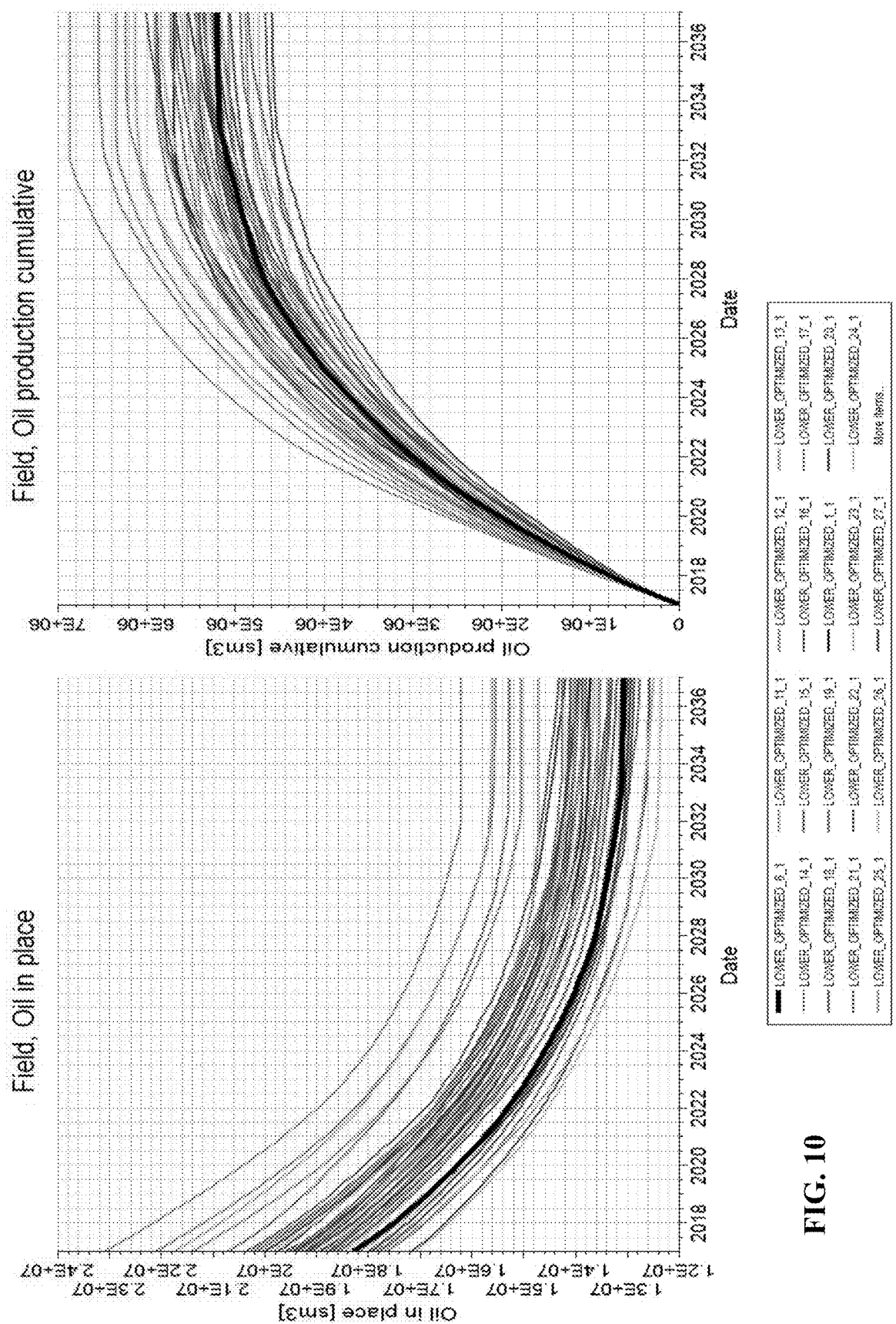
FIG. 10 is a graph showing the Performance of the Optimal Plan in the 50 subsurface Realizations—Olympus Lower Zone.

FIG. 10 is graph showing the Performance of the Optimal Plan in the 50 Realizations—Lower Zone for the BHSPO.

Figure 11:
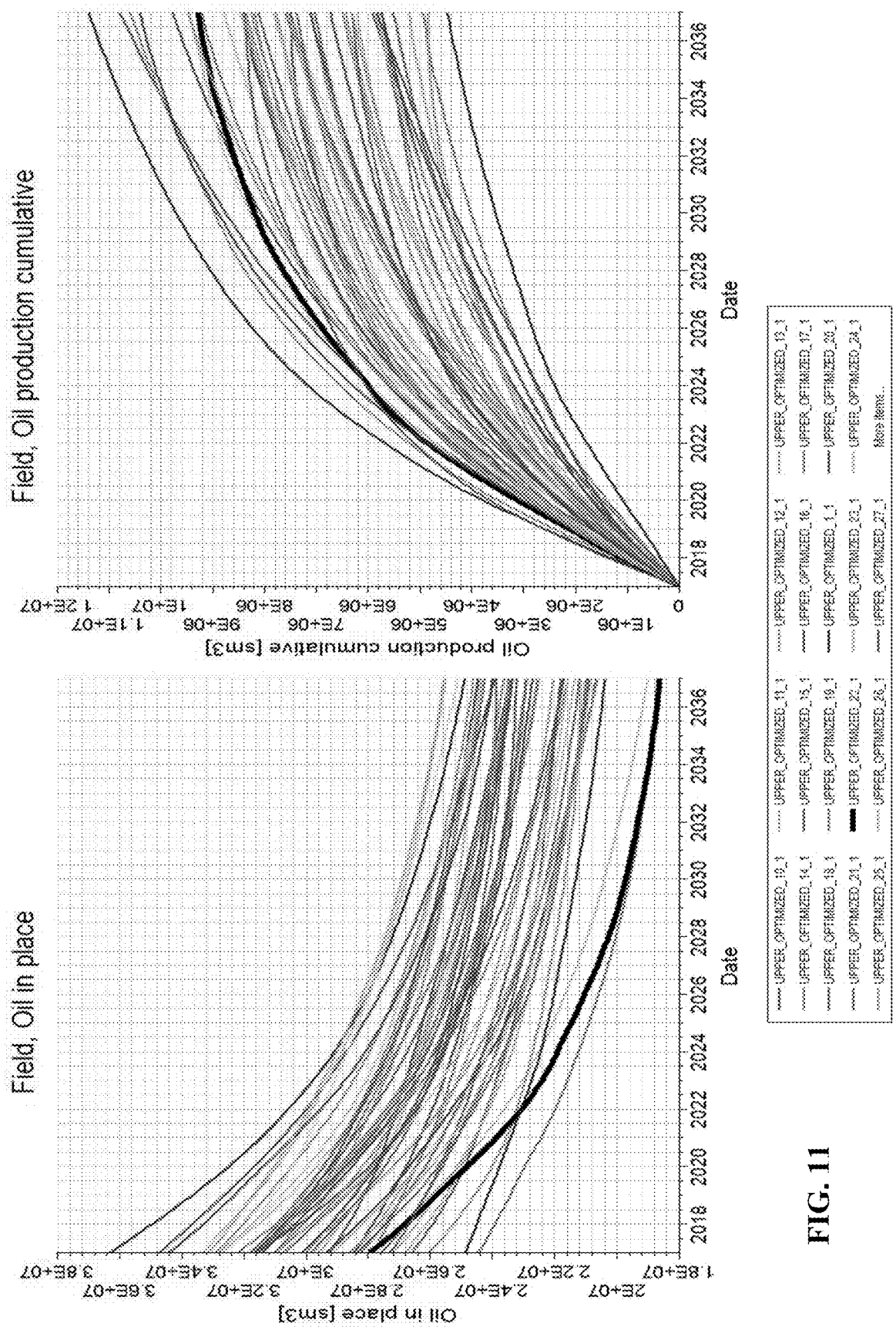
FIG. 11 is a graph showing Performance of the Optimal Plan in the 50 subsurface Realizations—Olympus Upper Zone.

FIG. 11 is graph showing Performance of the Optimal Plan in the 50 Realizations—Upper Zone for the BHSPO.

FIG. 12 is graph showing a predefined cutoff is applied to constrain the placement of the first producer to be above the oil-water contact in a high permeability area as it is being stochastically updated by PSO.

Conclusions

The BHSPO is a novel well placement optimization algorithm is deployed that: can be used for practical large scale field development planning projects; is virtually independent of the well count; systematically outperforms the standard PSO; is portable; BHSPO can used with any evolutionary algorithm or reservoir simulator; Core evolutionary algorithm (PSO); Sensitivity analysis on algorithmic parameters; Convergence criteria; Further investigations on uncertainty management; Switching between different model resolutions; and Scheduling.

Net Hydrocarbon Thickness Map

In this example, the net hydrocarbon thickness (NHCT) map is used as the main "quality map" for well placement. The NHCT is a "condensed" version of reservoir properties. It consolidates the information about the 3D porosity, permeability and hydrocarbon initially in place. For each cell in the aerial direction of a three-dimensional reservoir simulation model (i, j coordinates), the NHCT is calculated as following:

$$NHCT_{ij} = \sum_{k=1}^{N_k} \varphi_{ijk} NTG_{ijk} (1 - Sw_{ijk}) Z_{ijk}$$

where $\varphi_{ijk}$, $NTG_{ijk}$, $Sw_{ijk}$ and $Z_{ijk}$ denote the porosity, net-to-gross, water saturation and thickness of grid block cell ijk. Since $\varphi_{ijk}$, $NTG_{ijk}$ and $Sw_{ijk}$ are dimensionless, $NHCT_{ij}$ has the same unit as $Z_{ijk}$, that is meter (feet). $NHCT_{ij}$ is, generally, proportional to the following properties:

High porosity and permeability. These petrophysical properties intervene directly in the formula and indirectly through the dependency of the water saturation function on porosity, permeability and rock quality index, in general.

Height above free water level. Here also, $Sw_{ijk}$ equals 1 below the free water level (FWL), the irreducible water saturation ($Swi_{ijk}$) high enough above the FWL and a value between 1 and $Swi_{ijk}$ in the transition zone.

FIG. 13 depicts example NHCT map corresponding to Olympus Upper, Realization 22. The red color indicates high NHCT, which are typically the best locations to place a producer. On the other hand, the purple color depicts areas below the FWL or impermeable area (non-reservoir facies).

The use of NHCT map is very efficient for handling uncertainty because. Different realizations due to uncertainty in reservoir properties can be represented by their corresponding NHCT which enables a practically feasible workflow to generate, when needed, well placement scenarios corresponding to different realizations in the process of a field development planning process. Kh map is needed and used for well placement optimization in Peripheral water injection (vs. Pattern water injection where only the NHCT map is needed).

While the NHCT is ideal for producers placements or injectors in a pattern based water injection scheme, the "Kh" map is better positioned for water injector placement in a peripheral water injection process. For each cell in the aerial direction of a three-dimensional reservoir simulation model, the Kh is calculated as following:

$$Kh_{ij} = \sum_{k=1}^{N_k} k_{ijk} Z_{ijk}$$

where $k_{ijk}$ denotes the (aerial) permeability of grid block cell ijk. FIG. 13 depicts example Kh map corresponding to Olympus Upper, Realization 22.

Figure 14A:
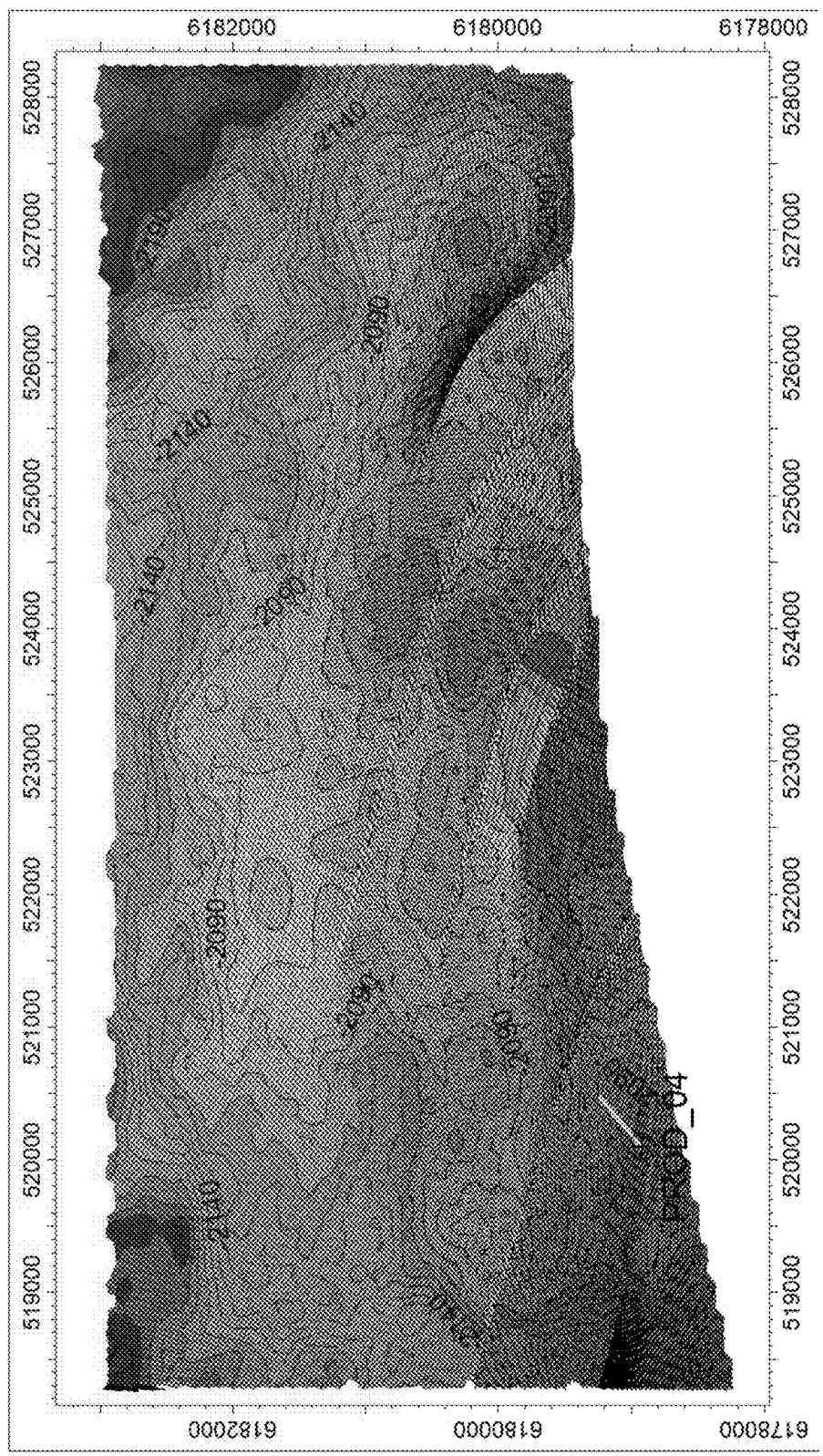
FIG. 14A is a graph showing a specific horizon/surface which is used as the guide for the aerial well placement of horizontal well sections.
Figure 14B:
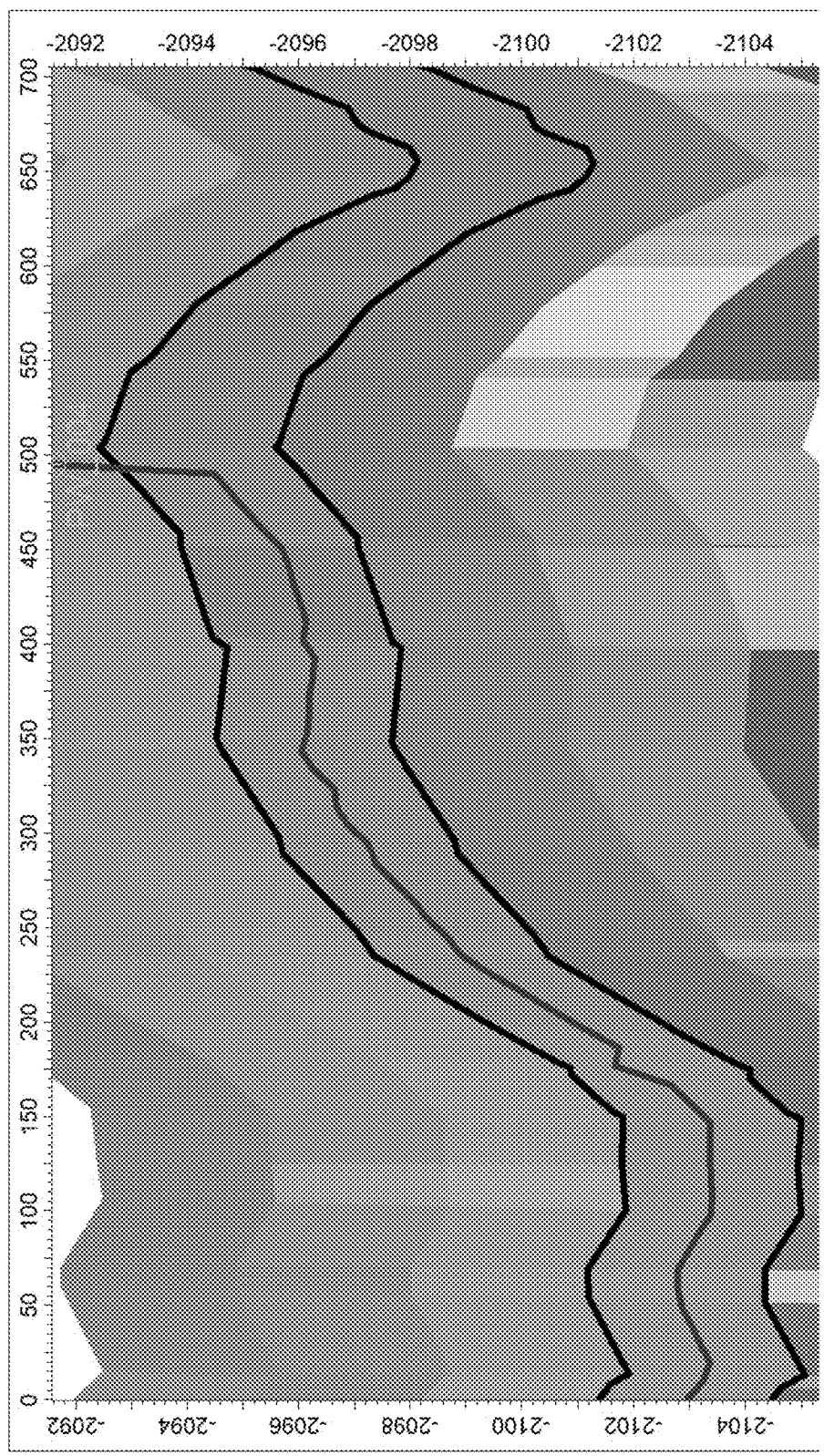
FIG. 14B is a graph illustrating the resulting placement of the horizontal section of one well based on the surface shown in FIG. 16A.

FIG. 14A is a graph showing a specific horizon/surface which is used as the guide for the aerial well placement of horizontal well sections. FIG. 14B is a graph illustrating the resulting placement of the horizontal section of one well based on the surface shown in FIG. 14A.

FIG. 15 is a graph showing well distribution corresponding to different well counts generated using the black hole operator. Horizontal length=500 m. Well spacing (2R)=1400 m. Olympus Upper.

FIG. 16 is a graph showing sensitivity on the number of wells generated using the black hole operator for two different horizontal section lengths. Olympus Upper, Realization 22, Pattern water injection.

Figure 17:
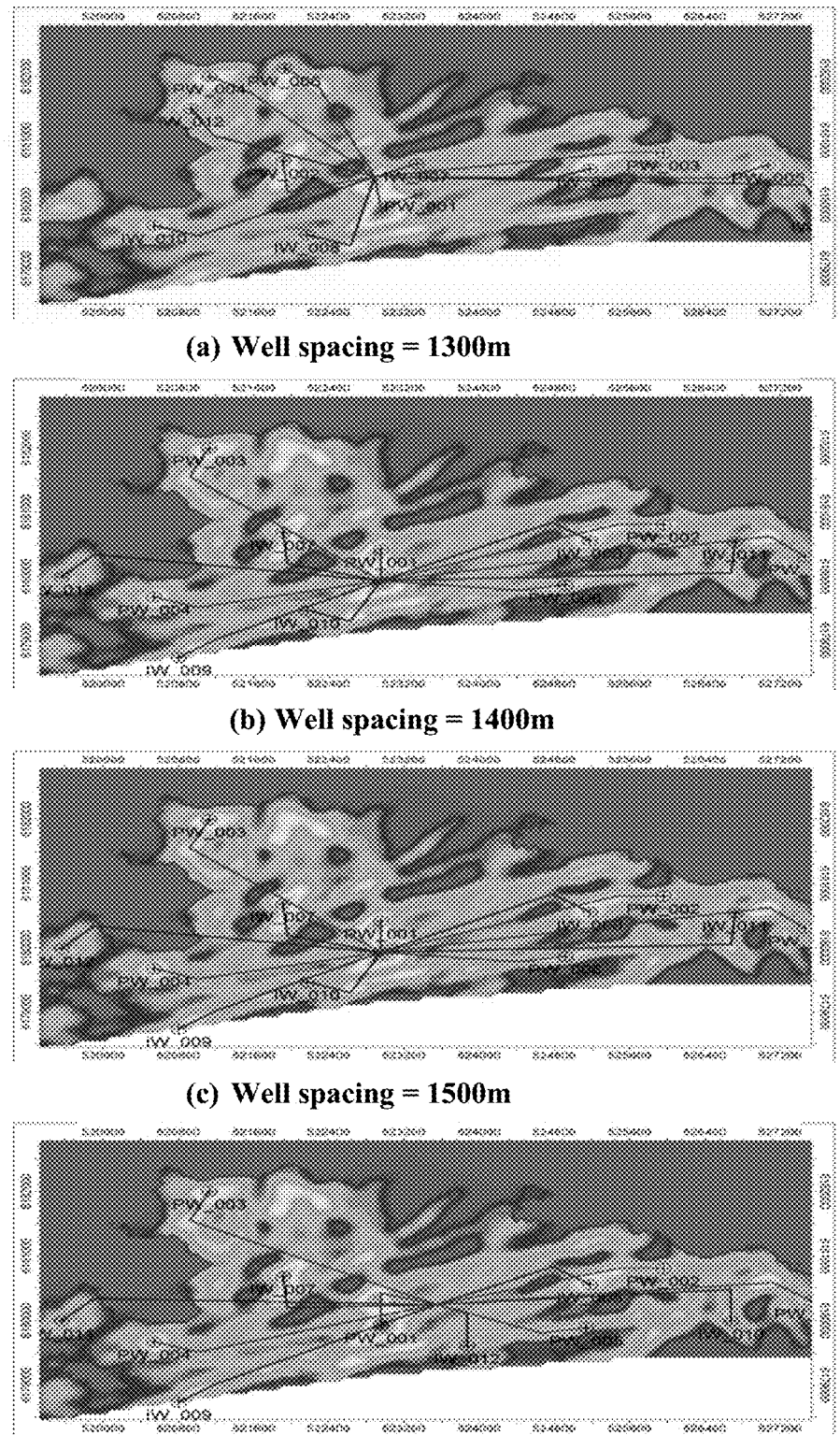
FIG. 17 is a graph showing sensitivity on well spacing. Wells are generated using the black hole operator. 12 Well, 500 m. Olympus Upper, Realization 22, Pattern water injection.

FIG. 17 is a graph showing sensitivity on well spacing. Wells are generated using the black hole operator. 12 Well, 500 m. Olympus Upper, Realization 22, Pattern water injection.

FIG. 18 is a graph showing sensitivity on the number of wells generated using the black hole operator for two different horizontal section lengths. Olympus Upper, Realization 22, Peripheral water injection.

Figure 19:
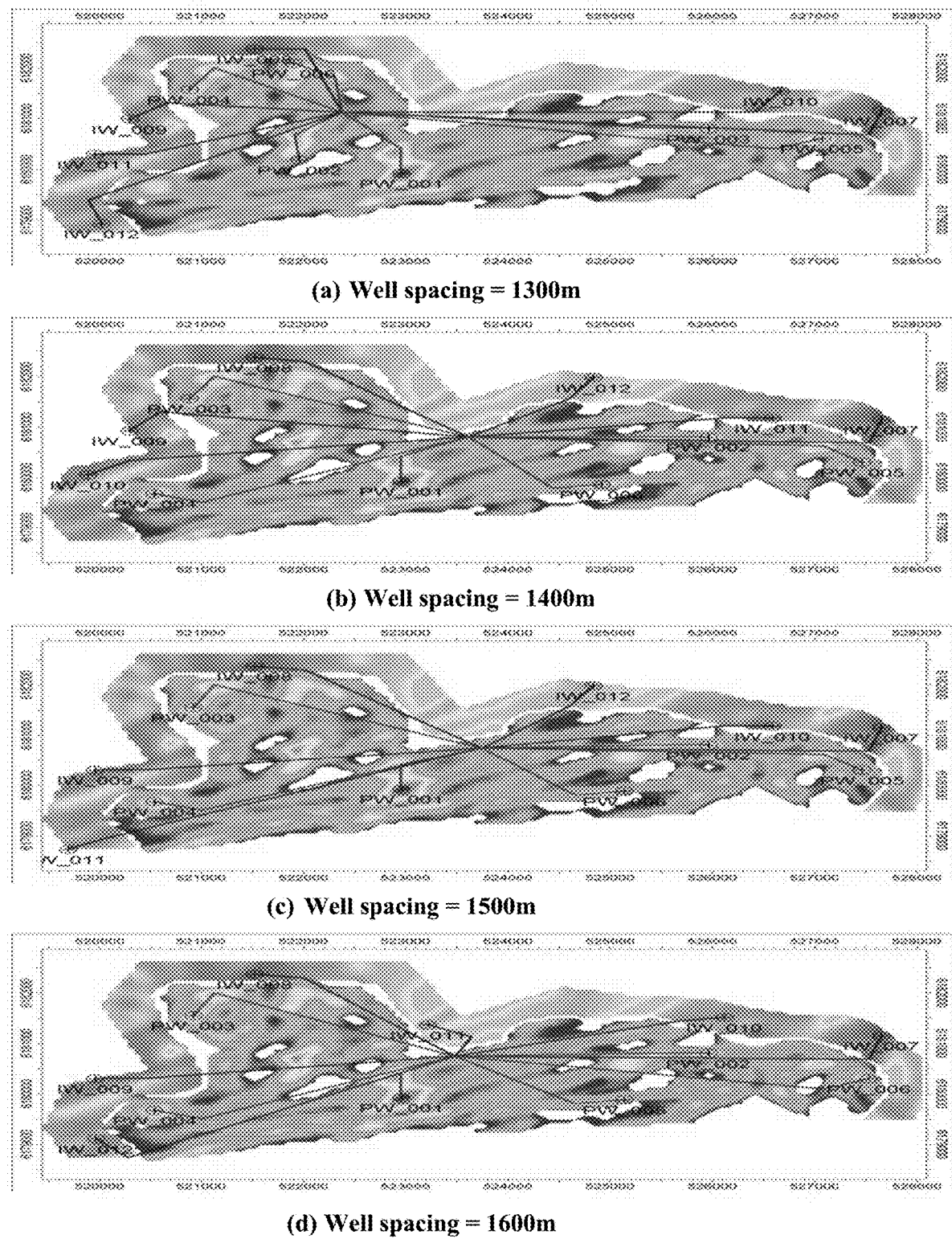
FIG. 19 is a graph showing sensitivity on well spacing. Wells are generated using the black hole operator. 12 Well, 500 m. Olympus Upper, Realization 22, Peripheral water injection.

FIG. 19 is a graph showing sensitivity on well spacing. Wells are generated using the black hole operator. 12 Well, 500 m. Olympus Upper, Realization 22, Peripheral water injection.

Conclusions

The BHSPO is a novel algorithm is disclosed that combines an efficient static, map-based optimizer, the blank hole operator, with the standard version of the popular particle swarm optimization. The BHPSO algorithm is based on a novel idea that incorporates the net hydrocarbon thickness map in the optimization process and ensures a guided, instead of random, well placement at each optimization iteration.

The combination of PSO with the blank hole operator depicted efficiency, robustness and practicability and was successful in jointly optimizing well count, location, type, and trajectory. BHPSO has a key feature: the number of optimization parameters is independent of the well count as only the location of the first well is identified using PSO. This leads to an extensive reduction in computational time, avoids over-parameterization problems and, most importantly, allows the method to be employed in practical field development planning projects. Over-parameterization, especially, poses a real challenge in adopting optimization methods in real field development projects where project time and CPU limitations practically eliminate most of the available optimization methods.

Strengths of the proposed method were illustrated on the Olympus optimization challenge where the new method systematically outperformed PSO in terms of both CPU and optimal solution reached. BHPSO leads to a 40 to 50% NPV increase compared to the initial guess with a relatively low number of iterations (less than 30 iterations) and particles (10 particles).

Field Studies

More field case studies to ensure that the algorithms can handle exceptions to reach the necessary level of robustness to be of commercial usage caliber.

System

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Software includes applications and algorithms. Software may be implemented in a smart phone, tablet, or personal computer, in the cloud, on a wearable device, or other computing or processing device. Software may include logs, journals, tables, games, recordings, communications, SMS messages, Web sites, charts, interactive tools, social networks, VOIP (Voice Over Internet Protocol), e-mails, and videos.

In some embodiments, some or all of the functions or process(es) described herein and performed by a computer program that is formed from computer readable program code and that is embodied in a computer readable medium. The phrase "computer readable program code" includes any type of computer code, including source code, object code, executable code, firmware, software, etc. The phrase "computer readable medium" includes any type of medium capable of being accessed by a computer, such as read only memory (ROM), random access memory (RAM), a hard disk drive, a compact disc (CD), a digital video disc (DVD), or any other type of memory.

All publications and patent applications mentioned in this specification are herein incorporated by reference to the same extent as if each individual publication or patent application was specifically and individually indicated to be incorporated by reference.

REFERENCES

Jiang, M., Luo, Y. P. and Yang, S. Y. [2007] Stochastic convergence analysis and parameter selection of the standard particle swarm optimization algorithm. Information Processing Letters 102(1), 8-16.

Sarma, P. and Chen, W. H. [2008] Efficient well placement optimization with gradient based algorithms and adjoint models. Intelligent energy conference and exhibition.

Trelea, I. C. [2003] The particle swarm optimization algorithm: convergence analysis and parameter selection. Information processing letters 85(6), 317-325.

Zhang, W., Ma, D., Wei, J.-j. and Liang, H.-f. [2014] A parameter selection strategy for particle swarm optimization based on particle positions. Expert Systems with Applications 41(7), 3576-3584.

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

What is claimed is:

1. A Black Hole Particle Swarm Optimization (BHPSO) system comprising one or more processors configured to perform operations of:
   a. generating a net hydrocarbon thickness (NHCT) map with a predefined cut-off on peer reservoir properties areas;
   b. initializing a plurality of input parameters for each particle in the swarm, wherein the plurality of input parameters includes a Discrete parameter or a Binary parameter; wherein the Discrete parameter includes a well spacing factor, a first producer position, and a Well count, and the Binary parameter includes a plurality of trajectories;
   c. selecting the position of the first producer on the cut-off NHCT map;
   d. deploying a Black Hole operator including:
      i. generating two copies of the cut-off NHCT map, wherein the first cut-off NHCT map is used for placing producers and the second cut-off NHCT map is used for placing injectors,
      ii. eliminating a disk or a black hole around the well of a radius equal to a 2× technical well spacing (TWS) of the first cut-off NHCT map and a radius equal to TWS of the second cut-off NHCT map,
      iii. positioning well locations/well heels of producer wells by order in cells having a maximum NHCT value from the two copies of the cut-off NHCT map and then creating a black hole of radius 2×TWS in the first cut-off NHCT map corresponding to producers placement after the placement of each producer;
      iv. positioning well locations/well heels of the injectors by order in cells having the maximum NHCT value and then creating a black hole of radius 1×TWS in the second cut-off NHCT map corresponding to injector placement after the placement of each injector, v. creating either horizontal wells or vertical wells, wherein the horizontal wells are created by rotating the injector wells or producer wells with a predefined horizontal section length; and then selecting an optimal azimuth of the horizontal section based on average NHCT values of a plurality of bypassed cells, vi. testing different platform locations and selecting one that leads to a minimum costing of the placed wells for the placed producers or the placed injectors;

e. running reservoir simulation models using a reservoir simulator once the vertical wells or the horizontal wells are created;

f. evaluating an objective function for each particle in the swarm;

g. implementing a decision step to determine whether a maximum iteration is reached or if a convergence condition is reached, wherein if either maximum iteration is reached or if a convergence condition is reached, then the system is finished through steps a. and g.; and the trajectories for the well position for oil, gas, or water in the hydrocarbon reservoir field are located, and if either maximum iteration is not reached or if a convergence condition is not reached, then step h. is implemented followed by step c. of selecting the position of the first producer on the cut-off NHCT map and proceeding to the Black Hole Operator; and h. updating velocity, position and local best of each particle and the global best of the swarm to position wells in a reservoir in field development planning and extracting hydrocarbons; and using the trajectories to drill the wells in the hydrocarbon reservoirs for oil, gas, or water.

2. The system of claim 1, wherein the first NHCT map is generated by consolidating information from porosity, permeability and hydrocarbon initially; for each cell in the aerial direction of a three-dimensional reservoir simulation model including i, j coordinates, calculating the NHCT map as following: $NHCT_{ij}=\Sigma_{k=1}^{Nk}\varphi_{ijk}NTG_{ijk}(1-Sw_{ijk})Z_{ijk}$; where $\varphi_{jik}$, $NTG_{tJk}$, $Sw_{ijk}$ and $Z_{ijk}$ denote a porosity, a net-to-gross, a water saturation and a thickness of a grid block cell, the grid block cell is ijk, and N is the number of reservoir layers.

3. The system of claim 2, further comprising placing a first well in Black Hole Particle Swarm Optimization (BHPSO) by placing only one well in a Particle Swarm Optimizer (PSO); PSO selecting the first well location including i and j coordinates based on results from previous iterations; once the well location is selected, eliminating the disk or the Black Hole from the first NHCT map around the selected location with a radius equals to 2×TWS, where TWS is the Technical Well Spacing; TWS is defined by:

$$TWS = \sqrt{\frac{A_r}{2\pi N_w}F},$$

where Ar, $N_w$ and F denote, a total $NHCT_{map\_cuttoff}$ area, the number of wells, and the "well spacing factor", respectively; and providing the $NHCT_{map\_cuttoff}$ is a cut-off $NHCT_{map}$ at a value of 2 meters to reduce a search area for an optimization algorithm.

4. The system of claim 3, further comprising placing the producer wells by: using the $NHCT_{map}$ to sequentially place remaining wells of the producers or the injectors; picking a location of the next producer or injector based on the maximum NHCT value on a relevant black-holed maps, $NHCT_{map\_prod}$ for producers and $NHCT_{map\_inj}$ for injectors; placing producers with the Black Hole operator while blacking the $NHCT_{map\_prod}$ with a radius of 2×TWS and the $NHCT_{map\_inj}$ with a radius 1×TWS around the location of the placed producers; after placing all producers, placing the injectors while blacking again the $NHCT_{map\_inj}$ with a radius of 2×TWS around the location of the placed injectors; and ensuring a pattern.

5. The system of claim 4, further comprising optimizing horizontal well azimuths by: providing the PSO algorithm with an option to alter a trajectory type of horizontal or vertical wells; providing the trajectory option as a binary variable where all wells are either horizontal or vertical; for horizontal trajectory, after locating a toe of the well, assessing the NHCT value corresponding to different azimuths and selecting an azimuth crossing through the cells having a maximum cumulative NHCT value; placing the horizontal wells in a plurality of specified vertical layers and altering by PSO the plurality of specified vertical layers length as an optimization parameter; and providing an increment as a user-set parameter; and choosing the wells for the vertical trajectory to be fully penetrating all the layers.

6. The system of claim 5, further comprising updating a swarm evaluation and algorithmic parameters by: holding several particles or simulation cases in each PSO iteration, wherein optimization parameters are updated at each iteration; feeding the simulation results into an operator that updates a position and velocity of each particle; defining values of the parameters of the next iteration in the optimization process by the updated position of each particles; and reiterating the updating the swarm evaluation and algorithmic parameters until convergence criteria is met.

7. The system of claim 6, further comprising using the Black Hole Particle Swarm Optimization method for well placement optimization in oil and gas field development.

8. The system of claim 6, further comprising using the Black Hole Particle Swarm Optimization method to jointly optimize the well count, location, type of well either injectors or producers, trajectory either vertical or horizontal, and horizontal section length.

9. The system of claim 6, further comprising using the Black Hole Particle Swarm Optimization method to make an optimization workflow of the algorithms independent of the number of wells involved in a field.

10. The system of claim 6, further comprising using the Black Hole Operator to work back to back with any algorithm to decrease a computational load of any algorithm by making the operation of the algorithm independent of the number of wells involved.

11. A computer program product for a Black Hole Particle Swarm Optimization (BHPSO), the computer program product comprising computer-readable instruction means stored on a non-transitory computer-readable medium that are executable by a computer having a processor for causing the processor to perform operations of:

a. generating a net hydrocarbon thickness (NHCT) map with a predefined cut-off on oil productive zones;

b. initializing a plurality of input parameters and position variables for each particle in the swarm, wherein the plurality of input parameters includes a Discrete parameter and a Binary parameter, and the discrete parameter includes a well spacing factor, a first producer position, and a Well count, and the Binary parameter includes a plurality of trajectory points;

c. selecting the position of the first producer on the cut-off NHCT map;

d. deploying a Black Hole operator including:
  i. generating two copies of the cut-off NHCT map, wherein the first cut-off NHCT map is used for placing producers and the second cut-off NHCT map is used for placing injectors,
  ii. eliminating a disk or a black hole around the well of a radius equal to a 2× technical well spacing (TWS) of the first cut-off NHCT map and a radius equal to TWS of the second cut-off NHCT map,
  iii. positioning well locations/well heels of remaining wells of the producers or the injectors by order in cells having a maximum NHCT value of the two copies of the cut-off NHCT maps and then creating a black hole of radius 2×TWS in the first cut-off NHCT map corresponding to producers placement after the placement of each producer;
  iv. positioning well locations/well heels of the injectors by order in cells having the maximum NHCT value and then creating a black hole of radius 1×TWS in the second cut-off NHCT map corresponding to injector placement after the placement of each injector,
  v. creating either horizontal wells or vertical wells, wherein the horizontal wells are created by rotating the horizontal wells with a predefined horizontal section length; and then selecting optimal azimuth of the horizontal section based on average NHCT values of a plurality of bypassed cells,
  vi. testing different platform locations and selecting one that leads to a minimum costing of the placed wells for the placed producers or the placed injectors;

e. running reservoir simulation models using a reservoir simulator once the vertical wells or the horizontal wells are created;

f. evaluating an objective function for each particle in the swarm;

g. implementing a decision step to determine whether a maximum iteration is reached or if a convergence condition is reached, wherein if either maximum iteration is reached or if a convergence condition is reached, then the computer program is finished through steps a. and g., and the trajectory points for the well positions for oil, gas, or water in the hydrocarbon reservoir field are specified, and if either maximum iteration is not reached or if a convergence condition is not reached, then step h. is implemented followed by step c. of selecting the position of the first producer on the cut-off NHCT map and proceeding to the Black Hole Operator; and h. updating velocity, position and local best of each particle and the global best of the swarm to position wells in a reservoir in field development planning and extracting hydrocarbons; and using the trajectory points to drill the wells in the hydrocarbon reservoirs for oil, gas, or water.

12. The computer program product of claim 11, further comprising using the Black Hole Particle Swarm Optimization with at least two steps: predefining the horizontal wells with a predefined horizontal section length ($Hz_L$); providing a pattern water injection with an injector to producer ratio of one ($IP_R$).

13. The computer program product of claim 12, further comprising generating ready to be used well trajectories for reservoir simulation purposes; and providing an input data and a plurality of parameters including: building the NHCT map using a pre-processor, and generating the NHCT map from group consisting of: a reservoir model, a fine geocelluar grid, and upscaled dynamic grid.

14. The computer program product of claim 12, further comprising providing a structured map $Horizon_{map}$ representing a horizon/depth in which the horizontal section to be placed; selecting a layer containing a largest quantity of hydrocarbon initially in place to generate the horizon.

15. The computer program product of claim 14, further comprising providing a number of producers and a number of injectors, $N_P$ and $N_{WI}$, respectively; providing a horizontal well section length, $Hz_L$; providing a well spacing that is a radius of the disk around the well, $R_D$; wherein the well spacing factor controls a maximum number of wells that are placed based on a given map; providing $N_P$ and $N_{WI}$ are a maximum number of wells.

16. The computer program product of claim 12, further comprising providing an increment to be used in optimizing well azimuth, $\delta_{Azimuth}$; providing a minimum and a maximum radius limit to restrict the well azimuth, $\delta_{Azimuth}$.

17. The computer program product of claim 12, further comprising providing a minimum distance between wells, $D_{min}$, which is a parameter that controls an optimization of the well azimuth.

* * * * *